(12) United States Patent
Nguyen et al.

(10) Patent No.: US 10,045,191 B2
(45) Date of Patent: Aug. 7, 2018

(54) METHOD FOR USE IN DEVICE-TO-DEVICE COMMUNICATION, WIRELESS COMMUNICATION SYSTEM, AND ARCHITECTURE

(71) Applicant: NEC Corporation, Tokyo (JP)

(72) Inventors: Phong Nguyen, Victoria (AU); Pushpika Wijesinghe, Victoria (AT)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 14/424,624

(22) PCT Filed: Apr. 9, 2014

(86) PCT No.: PCT/JP2014/060879
§ 371 (c)(1),
(2) Date: Feb. 27, 2015

(87) PCT Pub. No.: WO2014/175149
PCT Pub. Date: Oct. 30, 2014

(65) Prior Publication Data
US 2016/0037322 A1    Feb. 4, 2016

(30) Foreign Application Priority Data
Apr. 24, 2013   (AU) ................................ 2013901432

(51) Int. Cl.
*H04W 72/04*   (2009.01)
*H04W 8/00*    (2009.01)
(Continued)

(52) U.S. Cl.
CPC ............. *H04W 8/005* (2013.01); *H04W 4/70* (2018.02); *H04W 72/0446* (2013.01); *H04W 76/14* (2018.02); *H04W 76/23* (2018.02)

(58) Field of Classification Search
CPC ......... H04W 4/005; H04W 4/06; H04W 4/00; H04W 72/0446; H04W 72/04;
(Continued)

(56) References Cited

U.S. PATENT DOCUMENTS

2010/0165882 A1 *   7/2010   Palanki ................. H04W 76/14
                                                            370/254
2010/0257265 A1    10/2010   Hamada
(Continued)

FOREIGN PATENT DOCUMENTS

JP    2007-104600    4/2007
JP    2012-217104    11/2012
(Continued)

OTHER PUBLICATIONS

Chien, C. P. et al., "Exploiting spatial reuse gain through joint mode selection and resource allocation for underlay device-to-device communications," IEEE 15th International Symposium on Wireless Personal Multimedia Communications (WPMC), XP032294400, pp. 80-84 (Sep. 24, 2012).
(Continued)

*Primary Examiner* — Andrew Chriss
*Assistant Examiner* — Rasha Fayed
(74) *Attorney, Agent, or Firm* — Wilmer Cutler Pickering Hale and Dorr LLP

(57) ABSTRACT

A wireless communication system (100) is disclosed in which UEs (120a-120c) can operate in a cellular mode wherein data is transmitted from one UE to another via one or more access nodes in a cellular network, and at least some UEs (120c) are D2D-UEs which can also operate in a direct communication mode wherein a pair of D2D-UEs transmit data directly from one to the other, wherein D2D-UEs operating in the direct communication mode maintain control signaling connection with the network and periodically
(Continued)

change to the cellular mode and send CSI to the network, and the network uses CSI and/or network available geographical location information for D2D-UEs in determining whether to cause D2D-UEs to operate in the direct communication mode or the cellular mode.

16 Claims, 29 Drawing Sheets

(51) Int. Cl.
*H04W 76/14* (2018.01)
*H04W 4/70* (2018.01)
*H04W 76/23* (2018.01)

(58) Field of Classification Search
CPC ............ H04W 72/0413; H04W 72/08; H04W 72/042; H04W 72/0453; H04W 72/082; H04W 76/023; H04W 76/043; H04W 76/025; H04W 76/021; H04W 76/048; H04W 76/02; H04W 8/005; H04W 52/243; H04W 52/02; H04W 52/0216; H04W 52/383; H04W 88/04; H04W 88/02; H04W 88/06; H04W 40/04; H04W 92/12; H04W 84/042; H04W 84/045; H04W 84/18; H04W 36/30; H04W 36/02; H04W 24/10; H04L 5/14; H04L 5/0051; H04L 5/00; H04L 65/1083
USPC ....... 370/329, 310, 311, 312, 328, 466, 252; 455/509, 450, 39
See application file for complete search history.

(56) References Cited

U.S. PATENT DOCUMENTS

| | | | | |
|---|---|---|---|---|
| 2010/0279672 | A1* | 11/2010 | Koskela | H04W 36/30 455/418 |
| 2012/0020213 | A1* | 1/2012 | Horneman | H04W 76/043 370/231 |
| 2013/0170414 | A1* | 7/2013 | Kwon | H04W 72/042 370/311 |
| 2014/0022986 | A1* | 1/2014 | Wu | H04W 48/16 370/328 |
| 2014/0078952 | A1* | 3/2014 | Bontu | H04W 76/023 370/312 |
| 2014/0127991 | A1* | 5/2014 | Lim | H04W 76/023 455/39 |
| 2014/0185587 | A1 | 7/2014 | Jang et al. | |
| 2014/0213221 | A1* | 7/2014 | Chai | H04W 72/0493 455/411 |

FOREIGN PATENT DOCUMENTS

| | | |
|---|---|---|
| WO | WO-2007/043422 | 4/2007 |
| WO | WO-2010/102668 A1 | 9/2010 |
| WO | WO-2012/137634 | 10/2012 |
| WO | WO-2012/166969 A1 | 12/2012 |
| WO | WO-2013/032259 A2 | 3/2013 |
| WO | WO-2013/044864 A1 | 4/2013 |

OTHER PUBLICATIONS

Extended European Search Report issued by the European Patent Office for Application No. 14788898.6 dated Mar. 23, 2016 (13 pages).
International Search Report corresponding to PCT/JP2014/060879, dated Jul. 22, 2014, 5 pages.
LG Electronics, Evaluation Scenarios for Proximity based Services, 3GPP TSG-RAN WG1#72b R1-131308, Apr. 15, 2013, p. 6/8, 7/8 (8 pages).
3GPP TR 22.803 V12.1.0, Mar. 2013; 3rd Generation Partnership Project, Technical Specification Group Services and System Aspects; Feasibility study for Proximity Services (ProSe) (Release 12), p. 10-12 (4 pages).
ZTE, Evaluation methodology for LTE Device to Device proximity services, 3GPP TSG-RAN WG1#72b R1-131045, Apr. 15, 2013 (7 pages).
Japanese Notification of Reasons for Refusal issued by the Japan Patent Office for Japanese Application No. 2015-514273 dated May 29, 2018 (7 pages).

* cited by examiner

METHOD FOR USE IN DEVICE-TO-DEVICE COMMUNICATION, WIRELESS COMMUNICATION SYSTEM, AND ARCHITECTURE

CROSS-REFERENCE TO RELATED APPLICATIONS

This application is a national stage application of International Application No. PCT/JP2014/060879 entitled "METHOD FOR USE IN DEVICE-TO-DEVICE COMMUNICATION, WIRELESS COMMUNICATION SYSTEM, AND ARCHITECTURE," filed on Apr. 9, 2014, which claims the benefit of the priority of Australian Patent Application AU 2013901432, filed on Apr. 24, 2013, the disclosures of each of which are hereby incorporated by reference in their entirety.

TECHNICAL FIELD

The present invention relates to a method for use in device-to-device communication, a wireless communication system, and an architecture.

BACKGROUND ART

The following abbreviations may be found herein:

| | |
|---|---|
| 3GPP | Third Generation Partnership Project |
| BS | Base Station |
| CA | Carrier Aggregation |
| CC | Carrier Component |
| D2D mode | Direct Communication mode |
| D2D | Device-to-Device |
| D2D-UE | UE with Direct (or D2D) communication capability |
| D2D-SCH | D2D Shared Channel |
| DL | Downlink |
| DL-SCH | Downlink Shared Channel |
| DRX | Discontinuous Reception |
| eNB | Enhanced Node B |
| FDD | Frequency Division Duplex |
| GPS | Global Positioning System |
| HARQ | Hybrid-Automatic Retransmission Request |
| LTE | Long Term Evolution |
| LTE-A | LTE-Advanced |
| MAC | Medium Access Control |
| PCC | Primary Carrier Component |
| PCell | Primary Serving Cell |
| PDCP | Packet Data Convergence Protocol |
| Phys | Physical |
| ProSe | Proximity-based Services |
| RLC | Radio Link Control |
| RRC | Radio Resource Control |
| RX | Receive |
| SCC | Secondary Carrier Component |
| SCell | Secondary Serving Cell |
| SFN | System Frame Number |
| SPS | Semi Persistent Scheduling |
| TB | Transport Block |
| TDD | Time Division Duplex |
| TX | Transmit |
| UE | User Equipment |
| UL | Uplink |
| UL-SCH | Uplink Shared Channel |

Typically, when user equipments (UEs) or other mobile devices in a wireless communication system are operating in a cellular communication mode, data traffic goes through a centralised controller or access node such as base station (BS), even if the communicating devices are close to each other or even collocated. One benefit of centralised operation is improved ease of resource control & management and interference control & management. A potential drawback is less efficient resource utilisation. For instance, potentially double the amount of resources may be required for UEs operating in cellular mode. For example, in communication between two UEs operating in cellular communication mode, one cellular UE may need to have a first radio resource allocated between itself and the base station, and another radio resource may need to be allocated between the (or another) base station and the other cellular UE. An example of a centralized controller is an evolved NodeBs (eNBs) of long-term evolution (LTE).

SUMMARY OF INVENTION

Technical Problem

In comparison with the above, for UEs which are operating in a direct communication or device-to-device (D2D) mode, only one radio resource may be needed for communication between one D2D capable UE (D2D-UE) and a paired D2D-UE, when the two are sufficiently close to each other for direct communication to be possible. To help improve system throughput, and hence overall cell spectral efficiency, it may be desirable for a radio network to configure paired D2D-UEs to operate in a D2D mode where appropriate.

Mixed cellular and D2D modes are being explored in newer generation wireless technologies such as 3rd generation partnership project (3GPP) Long Term Evolution-Advanced (LTE-A) and worldwide interoperability for microwave access (WiMax). One example of a D2D mode network is an ad-hoc network where one D2D-UE may set up a direct connection with a pairing UE via a handshake and competition procedure.

Examples of cellular networks include widely deployed wireless networks such as universal mobile telecommunications system (UMTS) networks, Wideband Code Division Multiple Access (W-CDMA) networks, WiMax networks and 3GPP LTE networks.

It is to be clearly understood that mere reference herein to previous or existing apparatus, products, systems, methods, practices, publications or other information, or to any associated problems or issues, does not constitute an acknowledgement or admission that any of those things individually or in any combination formed part of the common general knowledge of those skilled in the field, or that they are admissible prior art.

Solution to Problem

As mentioned above, the present invention is concerned with communication of information between devices in a cellular network where direct device-to-device communication is allowed under cellular network control and management.

More specifically, in a first form, the present invention relates broadly to a wireless communication system comprising:

a cellular network including one or more access nodes, and user equipments (UEs) which can operate in a cellular mode where data is transmitted from one UE to another via one or more of the access nodes, and at least some UEs are device-to-device (D2D) capable UEs (D2D-UEs) which can also operate in a direct communication mode where a pair of D2D-UEs transmit data directly from one to the other, wherein D2D-UEs operating in the direct communication mode maintain control signalling connection with the cellular network, change to the cellular mode at one or more times and send channel state information (CSI) to the cellular network, and the cellular network uses CSI and/or network available geographical location information for D2D-UEs in determining whether to cause D2D-UEs to operate in the direct communication mode or to operate in the cellular mode.

A UE may operate in cellular mode if the other party (UE) is located far away or the link quality for direct communication is worse than that of the overlaid radio network. On the other hand, a D2D-UE may operate in direct communication (or D2D) mode if the pairing D2D-UE is sufficiently close and the link quality of the direct communication is (at least potentially) better than that of the overlaid cellular/radio network.

In the direct communication/D2D mode, two communicating D2D-UEs may share cellular network downlink or uplink resources with cellular mode UEs. Alternatively the two communicating D2D-UEs may use dedicated resources for direct communication. The said dedicated resources may be dedicated cellular uplink or dedicated cellular downlink resources on a primary carrier component or on a secondary carrier component or dedicated carrier component that are not a paired block of spectrum and not used for the overlaid cellular network uplink or downlink resources but being controllable by the overlaid cellular network. Preferably, in resources dedicated for D2D communications, no cellular mode communication should take place within a cell, a part of a network or the whole network.

It will be understood that, since any two communicating D2D-UEs may share cellular network downlink or uplink resources with cellular mode UEs or may operate on dedicated resources within dedicated cellular uplink or dedicated cellular downlink resources, it may be preferable that the overlaid cellular network can control any direct communication and thereby at least help to ensure the integrity and quality of the overall system and/or to provide an improvement in overall spectral efficiency. Furthermore, as any two communicating D2D-UEs may be subject to mobility (i.e. one or both may move), therefore the direct communication link may not always be guaranteed for the entire direct communication section and may degrade, especially when the two D2D communicating UEs move far away from each other or, for example, move into shadowing regions. Thus, the system may preferably allow resumption of cellular mode communication in the event of a failing or degrading direct communication link, and preferably with low overhead and delay and so as to ensure the continuous packet connectivity.

In one embodiment of the wireless communication system, the wireless communication system may be a D2D capable long term evolution (LTE) time division duplex (TDD) system without carrier aggregation (CA) capabilities. In this embodiment, the cellular mode may comprise a downlink transmission state and an uplink transmission state, wherein, in the downlink transmission state an access node performs signal and/or physical channel(s) transmission and a UE performs signal and/or physical channel(s) monitoring or reception on an allocated carrier frequency, and in the uplink transmission state the access node performs signal and/or physical channel(s) reception and a UE performs signal and/or physical channel(s) transmission also on the said carrier frequency. When a pair of D2D-UEs is operating in the direct communication mode, on a specific subframe of a radio frame, only one of the D2D-UEs may perform D2D transmission while the other may perform D2D reception on the said carrier frequency or on a carrier component dedicated for direct communication.

In another embodiment of the wireless communication system, the wireless communication system may be a D2D capable long term evolution (LTE) frequency division duplex (FDD) system without carrier aggregation (CA) capabilities. In this embodiment, in the cellular mode an access node may perform downlink signal and/or physical channel(s) transmission and a UE may perform downlink signal and/or physical channel(s) monitoring or reception on a downlink carrier frequency, and concurrently the access node may perform uplink signal and/or physical channel(s) reception and a UE may perform uplink signal and/or physical channel(s) transmission on an uplink carrier frequency. When a pair of D2D-UEs is operating in the direct communication mode, on a specific subframe of a radio frame, only one of the D2D-UEs may perform D2D transmission while the other may perform D2D reception on the downlink carrier frequency or on the uplink carrier frequency or on a carrier component dedicated for direct communication.

In the embodiment of the wireless communication system discussed in the previous paragraph, the D2D-UEs may each have a full duplexer enabling them to perform concurrent transmission and reception on different carrier frequencies, a D2D-UE operating in the direct communication mode which performs D2D reception on the cellular downlink carrier frequency on a specific subframe may perform cellular uplink signal and/or physical channel(s) transmission on the cellular uplink carrier frequency on the same subframe, and a D2D-UE operating in the direct communication mode which performs D2D transmission on the cellular uplink carrier frequency on a specific subframe may perform cellular downlink signal and/or physical channel(s) monitoring or reception on the cellular downlink carrier frequency on the same subframe.

In yet another embodiment of the wireless communication system, the wireless communication system may be a D2D capable long term evolution (LTE) time division duplex (TDD) system with carrier aggregation (CA) capabilities. In this embodiment, the cellular mode may comprise a downlink transmission state and an uplink transmission state, wherein; in the downlink transmission state an access node with CA capabilities performs downlink signal and/or physical channel(s) transmission on a cellular downlink resource on a primary component carrier (PCC) and optionally also on a cellular aggregated downlink resource on a secondary component carrier (SCC) and a UE performs signal and/or physical channel(s) monitoring or reception on the same primary, and optionally secondary, component carrier(s), and in the uplink transmission state an access node with CA capabilities performs signal and/or physical channel(s) reception, and a UE performs uplink signal and/or physical channel(s) transmission, on the primary component carrier and optionally also on the secondary component carrier. When a pair of D2D-UEs is operating in the direct communication mode, on a specific subframe of a radio frame, only one of the D2D-UEs may perform D2D transmission while the other may perform D2D reception on a resource configured by the network for direct communication.

In the embodiment of the wireless communication system discussed in the previous paragraph, the D2D-UEs may each have CA capabilities enabling them to perform either transmission or reception on more than one component carrier, when the resource configured by the network for direct communication is on the primary component carrier no cellular communication may be performed in the direct communication mode, when the resource configured by the network for direct communication is on the secondary component carrier or a component carrier dedicated for direct communication:

a D2D-UE operating in the direct communication mode which performs D2D reception on a specific subframe may perform cellular downlink signal and/or physical channel(s) monitoring or reception on the primary component carrier in the same subframe, and a D2D-UE operating in the direct communication mode which performs D2D transmission on a specific subframe may perform cellular uplink signal and/or physical channel(s) transmission on the primary component carrier in the same subframe.

In a further embodiment of the wireless communication system, the wireless communication system may be a D2D capable long term evolution (LTE) frequency division duplex (FDD) system with carrier aggregation (CA) capabilities. In this embodiment, in the cellular mode an access node may perform downlink signal and/or physical channel(s) transmission on one or both of a cellular primary downlink resource on a primary downlink component carrier and a cellular secondary downlink resource on an aggregated secondary downlink component carrier and UEs may perform downlink signal and/or physical channel(s) monitoring or reception on one or both of the primary downlink component carrier and the secondary downlink component carrier, and concurrently the access node may perform uplink signal and/or physical channel(s) reception on one or both of a cellular primary uplink resource on a primary uplink component carrier and a cellular secondary uplink resources on an aggregated secondary uplink component carrier and UEs may perform uplink signal and/or physical channel(s) transmission on one or both of the primary uplink component carrier and the secondary uplink component carrier. When a pair of D2D-UEs is operating in the direct communication mode, on a specific subframe of a radio frame, only one of the D2D-UEs may perform D2D transmission while the other may perform D2D reception on a resource configured by the network for direct communication.

In the embodiment of the wireless communication system discussed in the previous paragraph, the D2D-UEs may each have CA capabilities and may be able to perform reception and transmission on more than one component carrier, if the resource configured by the network for direct communication is on the primary uplink or downlink component carrier;

a D2D-UE which performs D2D reception on the primary downlink component carrier on a specific subframe may perform cellular uplink signal and/or physical channel(s) transmission on the primary uplink component carrier on the same subframe, a D2D-UE which performs D2D transmission on the primary uplink component carrier on a specific subframe may perform cellular downlink signal and/or physical channel(s) monitoring or reception on the primary downlink component carrier on the same subframe, and if the resource configured by the network for direct communication is on the secondary uplink or downlink component carrier or a component carrier dedicated for D2D, a D2D-UE which performs D2D transmission or reception on a particular sub-frame may optionally be configured to perform cellular uplink physical channel(s) and/or signal transmission and cellular downlink physical channel(s) and/or signal monitoring or reception on the primary uplink or downlink component carrier on the same sub-frame.

Further comments relating to the wireless communication system in the first form of the invention are given below.

The system may include one or more access nodes forming a cellular network that provides wireless connectivity for several mobile devices (UEs) under its cellular coverage. Among the mobile devices, at least two may be D2D-UEs capable of direct device-to-device communication. The D2D-UEs may belong to the same access node or different access nodes. When there is a need for a first D2D-UE to communicate with a second D2D-UE, the first and second D2D-UEs may first establish signalling/control connectivity with their access node(s). When the first D2D-UE is sufficiently close to the second D2D-UE and this is detected by their access node(s), for example, from the D2D-UE's network available geographical information, the access node(s) may configure the D2D-UEs to establish direct communication for data transmission and reception while maintaining control connectivity with the cellular access node(s).

The system model of the wireless communication system according to embodiments of the first form of the invention may be considered a system transition model, and the system transition model may comprise two modes: a cellular communication mode (or cellular mode) and a direct communication (or D2D) mode. In the cellular mode, functions and features related to direct communication may be disabled and this may be understood by access node(s). In the direct communication/D2D mode, functions and features related to direct communication are enabled. In the direct communication mode, among paired D2D-UEs, within a particular time duration such as a subframe, there may be only one D2D-UE which performs transmission and the other D2D-UE (or other D2D-UEs forming a group) may perform reception. For long-term evolution (LTE) time division duplex (TDD) D2D-UEs, functions related to cellular communication may not be activated while the D2D-UE is in direct communication mode. For LTE frequency division duplex (FDD) D2D-UEs, functions related to cellular transmission may be activated while the D2D-UE is in direct communication mode for reception. For LTE FDD D2D-UEs, functions related to cellular reception may be activated while the FDD D2D-UE is in direct communication mode for transmission. For LTE TDD or FDD D2D-UEs with carrier aggregation (CA), functions related to cellular communication may be activated on a cellular Primary Carrier Component (PCC) while TDD D2D-UEs in D2D mode operate on cellular network configured Secondary Carrier Component (SCC) or on a carrier component dedicated for D2D. In performing D2D transmission or D2D reception, D2D-UEs may use cellular network downlink frame, subframe and symbols timing as reference timing for D2D transmission or D2D reception. Periodic transitions between cellular mode and direct communication mode, and via versa, may happen on a sub-frame basis according to network preconfigured timing pattern, for example, by utilising the current LTE DRX and SPS for UL features.

In a second form, the present invention relates broadly to architectures for a D2D-UE's transmitter and receiver.

In one embodiment of the second form of the invention, an architecture for a transmitter of a device-to-device (D2D) capable UE (D2D-UE) is provided, the architecture including a physical (Phys) layer which has a long term evolution (LTE) transmitter for cellular uplink communication on a resource allocated for cellular uplink transmission and a D2D transmitter for D2D communication on a resource allocated for D2D transmission, a medium access control (MAC) layer which has:
one or more LTE hybrid-automatic retransmission request (HARQ) entities for cellular communication and also a D2D HARQ entity for D2D communication, and a LTE-D2D mode switching entity for selecting the appropriate HARQ entity/entities and for providing control signals for selecting the appropriate transmitter for one or both of cellular and D2D communication with time, a LTE radio link control (RLC) layer, and a packet data convergence protocol (PDCP) layer.

In the embodiment of the architecture in the previous paragraph, the D2D-UE may not have carrier aggregation (CA) capabilities, the MAC layer may have a single LTE HARQ entity for cellular communication, and the LTE-D2D mode switching entity may be for selecting the appropriate HARQ entity and for providing control signals for selecting the appropriate transmitter for either cellular or D2D communication with time. Alternatively, the D2D-UE may have carrier aggregation (CA) capabilities, the MAC layer may have more than one LTE HARQ entities for cellular communication, and the LTE-D2D mode switching entity may be for selecting the appropriate HARQ entity and for providing control signals for selecting the appropriate transmitter for cellular and/or D2D communication with time.

In another embodiment of the second form of the invention, an architecture for a receiver of a device-to-device (D2D) capable UE (D2D-UE) is provided, the architecture including:

a physical (Phys) layer which has a long term evolution (LTE) receiver for cellular downlink communication on a resource allocated for cellular downlink transmission and a D2D receiver for D2D communication on a resource allocated for D2D transmission, a medium access control (MAC) layer which has:
one or more LTE hybrid-automatic retransmission request (HARQ) entities for handling transport channel(s) reception in cellular communication and also a D2D HARQ entity for handling transport channel reception in D2D communication, and a LTE-D2D mode switching entity for selecting the appropriate HARQ entity/entities and for providing control signals for selecting the appropriate receiver for one or both of cellular and D2D communication with time, a LTE radio link control (RLC) layer, and a packet data convergence protocol (PDCP) layer.

In the embodiment of the architecture in the previous paragraph, the D2D-UE may not have carrier aggregation (CA) capabilities, the MAC layer may have a single LTE HARQ entity for cellular communication, and the LTE-D2D mode switching entity may be for selecting the appropriate HARQ entity and for providing control signals for selecting the appropriate receiver for either cellular or D2D communication with time. Alternatively, the D2D-UE may have carrier aggregation (CA) capabilities, the MAC layer may have more than one LTE HARQ entities for cellular communication, and the LTE-D2D mode switching entity may be for selecting the appropriate HARQ entity and for providing control signals for selecting the appropriate receiver for cellular and/or D2D communication with time.

In a third form, the present invention relates broadly to a method for use in device-to-device (D2D) communication in a wireless communication system, the wireless communication system comprising; a cellular network including one or more access nodes, and user equipments (UEs) which can operate in a cellular mode where data is transmitted from one UE to another via one or more of the access nodes, at least some UEs being D2D capable UEs (D2D-UEs) which can also operate in a direct communication mode where a pair of D2D-UEs transmit data directly from one to the other over a D2D communication link (D2D link), the method comprising:

maintaining a control signaling connection between D2D-UEs operating in the direct communication mode and the cellular network, causing D2D-UEs operating in the direct communication mode to change to the cellular mode at one or more times and to send channel state information (CSI) to the cellular network, and using the CSI and/or network available geographical location information for D2D-UEs to determine whether to cause D2D-UEs to operate in the direct communication mode or the cellular mode.

The method may further include one or more of the following:

performing network assisted discovery which may include determining if D2D-UEs are available for direct communication, performing initial D2D link evaluation which may include assessing channel state information (CSI) of one or both of the D2D link and the cellular network to decide whether to establish direct communication or continue cellular mode communication, performing D2D link establishment to establish the D2D link, performing direct communication over the D2D link, and performing D2D link termination to terminate the D2D link.

Performing network assisted discovery may include one D2D-UE being assigned a role of D2D group owner and one or more other D2D-UEs being assigned a role of D2D client, wherein a D2D group owner and a D2D client are paired D2D-UEs for direct communication. The D2D link establishment, the direct communication and the D2D link termination may be performed only if D2D-UEs are available for direct communication and it is decided to proceed with direct communication in the D2D link evaluation.

Performing initial D2D link evaluation may include the following:

switching paired D2D-UEs to the direct communication mode, in the direct communication mode, the D2D group owner sends a probe request message to the D2D client and upon reception of the probe request message the D2D client may respond with a probe response message that may include CSI observed by the D2D client to the D2D group owner, the D2D group owner performs CSI measurement and may include CSI observed by the D2D client in the D2D group owner's own CSI measurement, paired D2D-UEs switch back to cellular mode at a predefined time, in the cellular mode, the D2D group owner sends D2D link CSI to its access node, and the access node performs D2D link management, said D2D link management including comparing the reported D2D link CSI with cellular link CSI, and making a decision on whether to activate direct communication or continue cellular communication for D2D-UEs.

Performing the D2D link management may include deriving direct communication parameter values for use in the direct communication if it is decided to activate direct communication.

Performing direct communication over the D2D link may further include the following:
  switching both paired D2D-UEs to the direct communication mode at a predefined time to start direct data exchange,
  performing direct data exchange between paired D2D-UEs,
  performing a D2D link CSI measurement by paired D2D-UEs at predetermined times,
  at a predetermined time both paired D2D-UEs switch to cellular mode and send a CSI report to their access node(s), the reported CSI including CSI measured by the D2D-UE in direct communication mode and CSI measured by the D2D-UE in cellular mode,
  based on reported CSI, the D2D group owner's access node performs an interference management & connection evaluation procedure and sends updated D2D parameter values for D2D reconfiguration to D2D-UEs,
  after each reception of updated D2D parameter values a D2D-UE switches back to direct communication mode for a new cycle of direct communication.

D2D link termination may be performed when a D2D transaction has been completed, or by a failure of the D2D link, or by cellular network access nodes.

Any of the features described herein can be combined in any combination with any one or more of the other features described herein within the scope of the invention.

Advantageous Effects of Invention

According to the present invention, it is possible to operate appropriately in a D2D mode.

DESCRIPTION OF EMBODIMENTS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as above.

Figure 1:
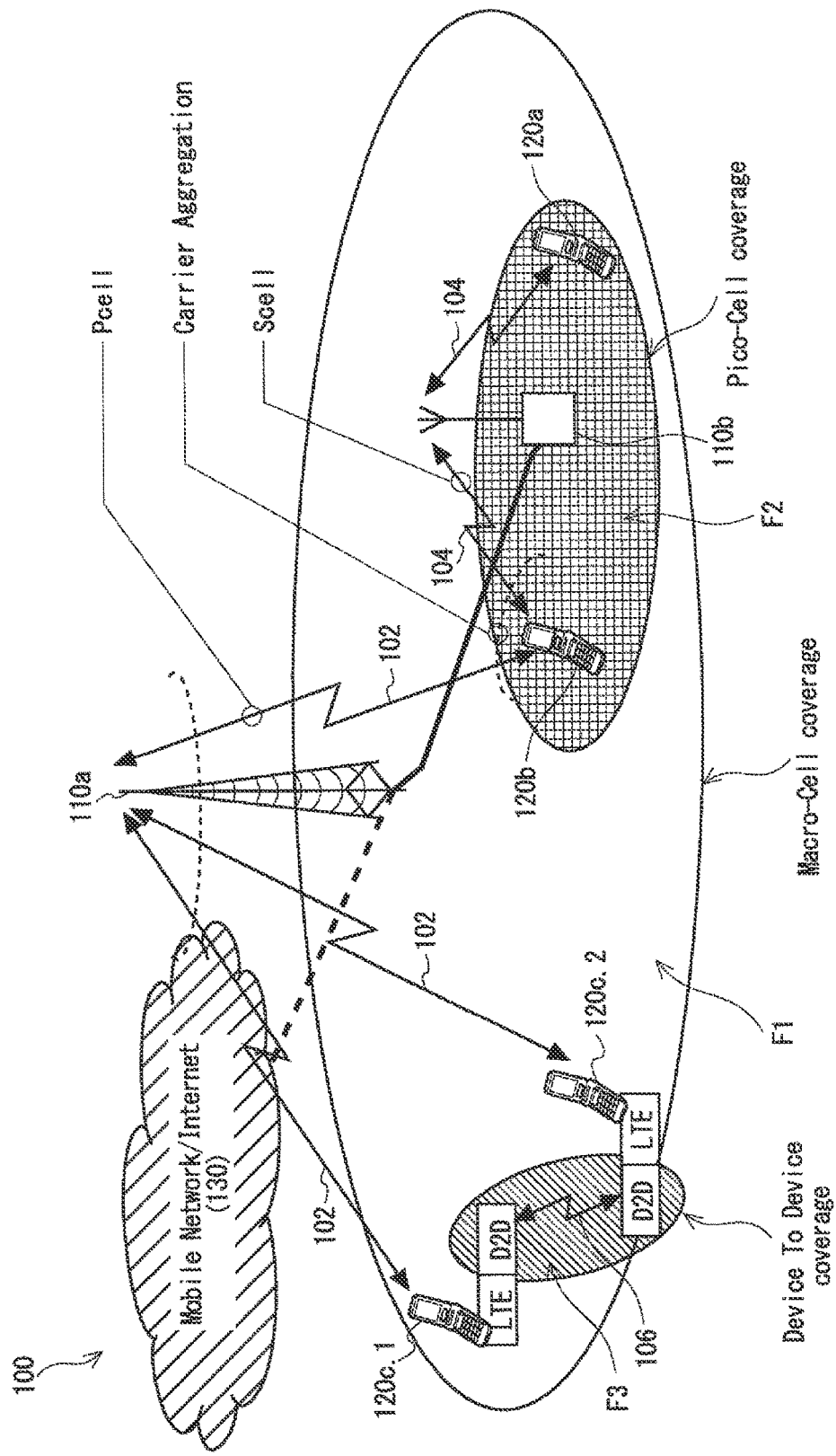
FIG. 1 illustrates an example wireless communication system with two D2D capable LTE UEs forming a pair for direct communication, where the two D2D capable LTE UEs belong to a single controller such as base station.

FIG. 1 illustrates a communication network for same cell device-to-device direct communication. FIG. 1 illustrates an example wireless communication system 100. The wireless communication system 100 illustrated in FIG. 1 includes a first access node 110a which is a macro base station (BS). The base station could be an eNB, for example. The access node/eNB 110a provides macro-cell coverage and wireless connectivity 102 to UEs 120b, 120c.1 and 120c.2 on paired or unpaired carrier frequency F1. The wireless communication system 100 also includes a second access node 110b which is a pico-base station with pico-cell coverage within the macro-cell coverage of the overlaid BS 110a. The pico-base station provides wireless connectivity 104 to UEs 120b and UE 120a on paired or unpaired carrier frequency F2.

The first access node 110a and second access node 110b are interconnected by a Mobile Network/Internet 130 which provides network connectivity with other access nodes and/or the internet. The UEs 120a, 120b, and 120c may be capable of supporting carrier aggregation (CA) features/functions and/or D2D features/functions. Upon a network access, an access node such as the first (110a) or second (110b) access node should be informed of whether UEs are capable of being configured for direct communication without or with CA. For UEs that are capable of supporting direct communication such as D2D-UE 120c.1 and D2D-UE 120c.2, and based on network available geographical location information such as network based GPS (Global Positioning System), an access node such as BS 110a may assist in device discovery and may configure D2D-UEs 120c.1 and D2D-UE 120c.2 under its control and coverage for direct communication 106 on carrier frequency F3 as a means to offload traffic going through BS 110a, provided D2D-UE 120c.1 and D2D-UE 120c.2 are sufficiently close to each other and subjected to good (or at least sufficient) direct link quality.

Figure 2:
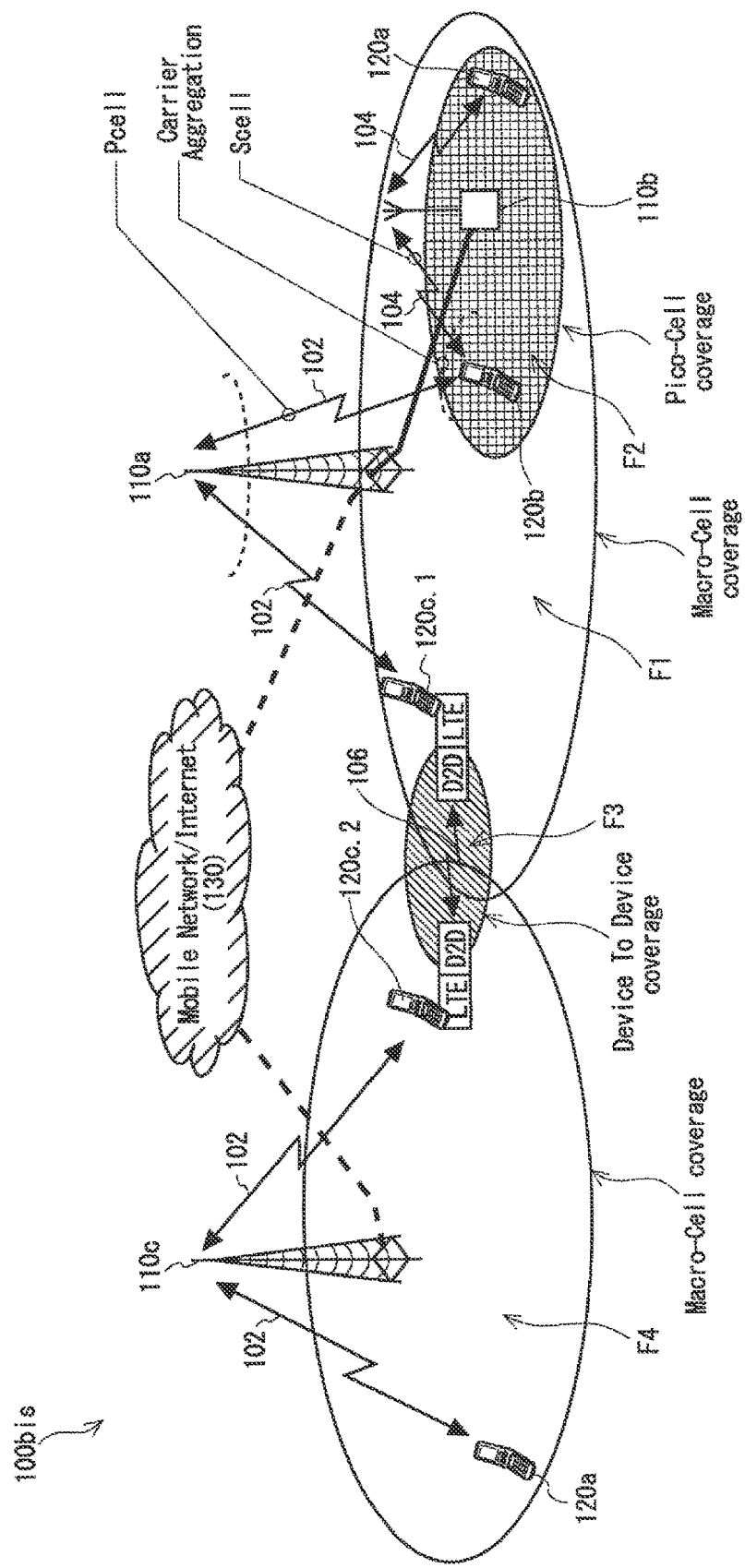
FIG. 2 illustrates an example wireless communication system with two D2D capable LTE UEs forming a pair for direct communication, where the two D2D capable LTE UEs belong to two different controllers such as two different base stations of two different operators.

FIG. 2 illustrates a communication network for different cell device-to-device direct communication. FIG. 2 illustrates another example wireless communication system 100bis. The example wireless communication system 100bis in FIG. 2 is slightly expanded upon compared to the example wireless communication system 100 in FIG. 1 in that the wireless communication system 100bis further includes a third access node (BS) 110c which provides wireless connectivity to UEs 120a and 120c.2 on paired or unpaired carrier frequency F4. The first access node BS 110a provides wireless connectivity to UEs 120b and 120c.1. Both the first access node and the third access node are interconnected through the Mobile Network/Internet 130 which provides network connectivity for signalling and data among all access nodes, including the first (110a) and third (110c) access nodes. Based on network available geographical location information, access nodes such as BS 110a and 110c may assist in device discovery and may configure D2D-UEs 120c.1 and D2D-UE 120c.2 under their control and coverage for direct communication 106 on carrier frequency F3 as a means to offload traffic going through their networks (i.e. through BS 110a and BS 110c), provided D2D-UE 120c.1 and D2D-UE 120c.2 are sufficiently close to each other and subjected to good (or at least sufficient) direct link quality. The carrier frequency F4 may be the same as the carrier frequency F1.

Two communicating D2D-UEs (e.g. 120c.1 and 120c.2) may share cellular network downlink or uplink resources with cellular mode UEs (120a and 120b). That is, the carrier frequency F3, on which D2D connectivity 106 is established between D2D-UEs 120c.1 and 120c.2, may be the same as F1 for the example wireless communication system 100, or the same as either F1 or F4 (if F1 and F4 are different) for the example wireless communication system 100bis. Alternatively the two communicating D2D-UEs 120c.1 and 120c.2 may use dedicated resources for D2D communication. The dedicated resources may be dedicated cellular uplink or dedicated cellular downlink resources or dedicated resources that are not a paired block of spectrum such as F3 (F3≠F1 and F3≠F4) and not used for the overlaid cellular network uplink or downlink communication but still controllable by the overlaid cellular network. In the resources dedicated for D2D communications, no cellular mode communication takes place whether within a cell, a part of a network or the whole network.

An important aspect of direct communication under network control is that paired D2D-UEs should preferably be allowed to perform direct communication while maintaining signalling connectivity with the overlaid cellular network(s). This may make it possible, or at least help, to ensure that cellular network based communication may be resumed if the D2D direct communication degrades beyond an expected or allowable quality or fails.

Disclosed herein is a concept for a system that may allow D2D features and functions to be integrated into legacy UE systems as add-on components or functions that require little or no change to the legacy UE systems. Furthermore, the concept may desirably allow D2D features and functions to be common for both existing full duplex LTE-FDD and half duplex LTE-TDD system.

Figure 3:
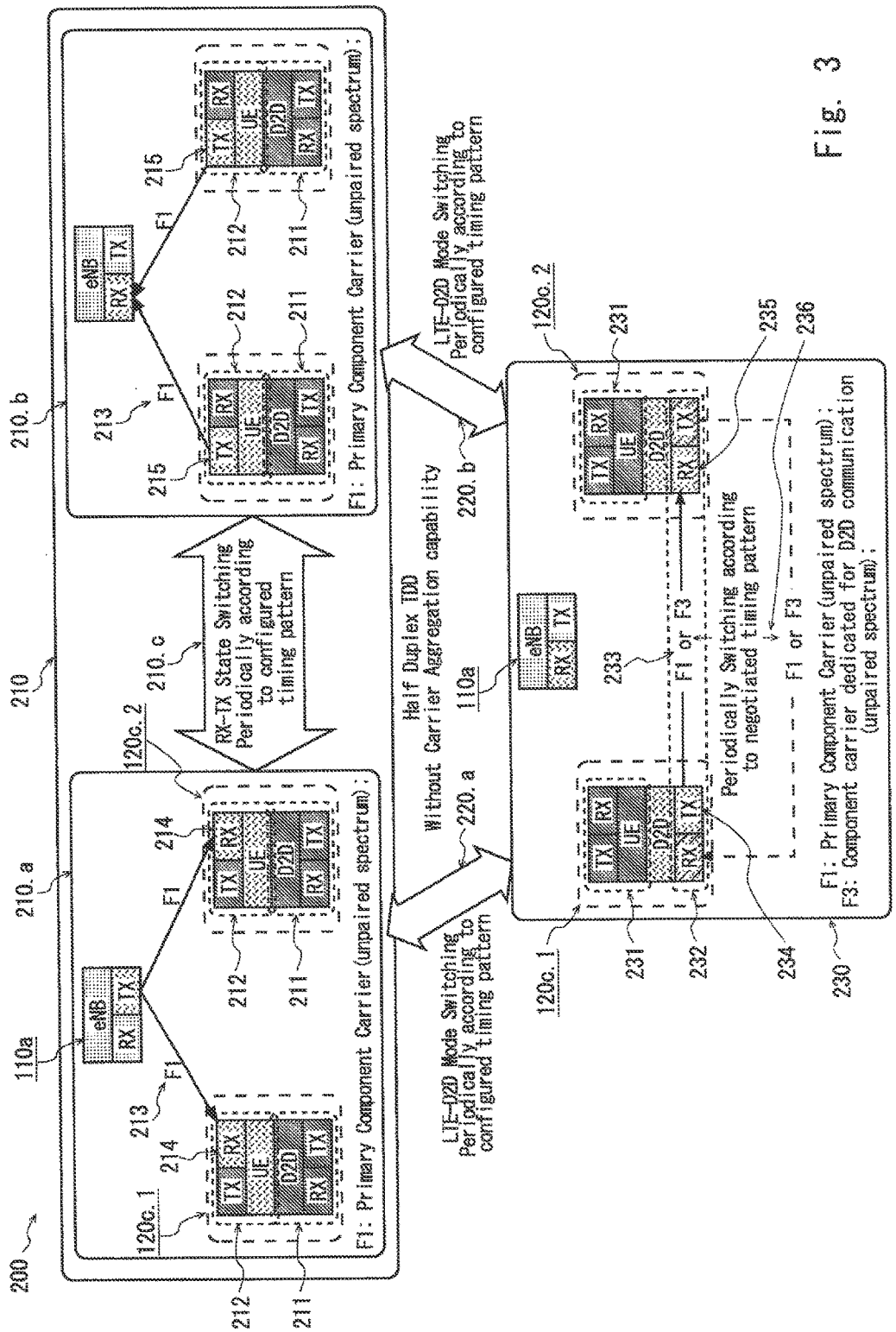
FIG. 3 illustrates an example mode transition diagram for a D2D capable LTE-TDD system without carrier aggregation.

FIG. 3 shows an example mode transition diagram for a D2D capable LTE-TDD system without carrier aggregation (CA). In FIG. 3, the system is denoted generally by reference numeral 200. FIG. 3 illustrates that current legacy LTE-TDD systems consist of two states, namely a downlink transmission state 210.a and an uplink transmission state 210.b which together form the cellular communication mode 210. In downlink transmission state 210.a, an access node 110a (such as an eNB) may perform signal and/or physical channel(s) transmission while a UE 120 (such as D2D-UE 120c.1 or 120c.2 for example) may perform signal and/or physical channel(s) monitoring or reception 214 on carrier frequency F1 213. In uplink transmission state 210.b, an access node 110a (such as an eNB) may perform signal and/or physical channel(s) reception while a UE (such as D2D-UE 120c.1 or 120c.2 for example) may perform physical channel(s) and/or signal transmission 215 also on carrier frequency F1 213.

According to the 3GPP LTE, the transition 210.c between downlink transmission state 210.a and uplink transmission state 210.b, and via versa, happens on a sub-frame basis according to seven predefined UL-DL configuration patterns. Allowing direct communication concurrently with either cellular downlink transmission state 210.a or cellular uplink transmission state 210.b is not preferable as a full duplexer would be required for D2D capable LTE-TDD UEs (such as D2D-UEs 120c.1 or 120c.2) to enable concurrent transmission and reception. Furthermore, sharing of cellular network downlink or uplink resources for direct communication may not be desirable (or may not even be possible) as LTE-TDD D2D-UEs such as D2D-UEs 120c.1 or 120c.2 may transmit and receive on the same carrier frequency, and that may lead to the situation where a D2D-UE may receive its own transmitted signal.

Therefore, presently proposed for direct communication, with reference to FIG. 3, is a "Direct communication mode" or "D2D mode" 230, which is in addition to the current cellular TDD communication mode 210, while also maintaining D2D-UE(s) in RRC_CONNECTED; that is, maintaining D2D-UE(s) in control signalling connection with the overlaid cellular network(s).

In the proposed direct communication mode 230, the cellular communication function 231 of paired D2D-UEs (e.g. 120c.1 and 120c.2) is disabled, and the direct communication function 232 of paired D2D-UEs (e.g. 120c.1 and 120c.2) is enabled. Also, among paired D2D-UEs 120c.1 and 120c.2, on a specific sub-frame, only one D2D-UE (i.e. either 120c.1 or 120c.2) performs D2D transmission 234 while the other D2D-UE (i.e. 120c.2 or 120c.1 respectively) performs reception 235 on the network configured shared downlink or uplink cellular network resources (F1) or dedicated resources for direct communication (F1 or F3) 233, as discussed above. Direct communication role switching 236 (e.g. so that which of the D2D-UEs performs D2D transmission and D2D reception, respectively, swaps), is allowed on a sub-frame basis according to a timing pattern negotiated between paired D2D-UEs. D2D-UEs will use cellular network downlink frame, subframe and symbol timing as reference timing for D2D transmission 234 and D2D reception 235.

Also proposed are periodic transitions 220.a and 220.b; that is, transitions between cellular communication states 210.a and 210.b (i.e. the cellular communication mode 210) on the one hand, and direct communication mode 230 on the other hand, and via versa. The transitions 220.a and 220.b happen as frequently as on a sub-frame basis according to a network preconfigured timing pattern by utilising current LTE discontinuous reception (DRX) and semi persistent scheduling (SPS) for UL features. This is discussed further below.

Figure 4:
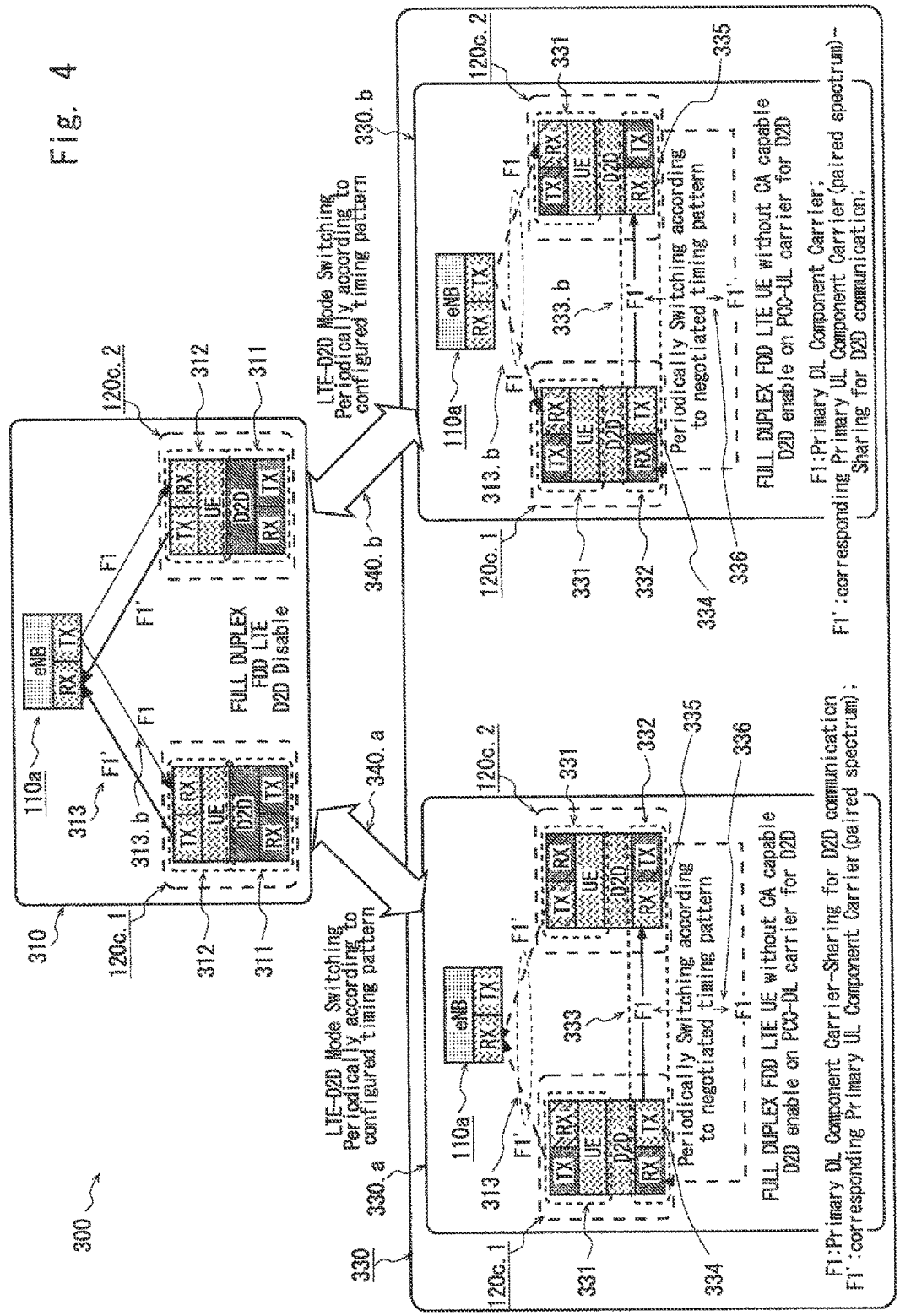
FIG. 4 illustrates an example mode transition diagram for a D2D capable LTE-FDD system without carrier aggregation.

FIG. 4 shows an example mode transition diagram for a D2D capable LTE-FDD system without carrier aggregation (CA). In FIG. 4, the system is denoted generally by reference numeral 300. Presently proposed for supporting direct communication, with reference to FIG. 4, is a "direct communication mode" 330 which is in addition to current cellular FDD communication mode 310, and a method for periodic switching 340.a and 340.b to and from "cellular communication mode" 310, while maintaining D2D-UE(s) in RRC_CONNECTED for control connectivity with the overlaid cellular network.

In cellular FDD communication mode 310, by following the same rule defined for the TDD system 200 above, the cellular communication function 312 of paired D2D-UEs 120c.1 and 120c.2 is enabled, and the direct communication function 311 of the paired D2D-UEs is disabled. An access node 110a (such as an eNB) may perform downlink signal and/or physical channel(s) transmission on cellular downlink resources 313.b on carrier frequency F1, while a UE 120 (including paired D2D-UEs 120c.1 and 120c.2) may perform signal and/or the physical channel(s) monitoring or reception on the same carrier frequency. Concurrently, an access node 110a (such as an eNB) may perform uplink signal reception and/or physical channel(s) reception on cellular uplink resources 313 on pairing uplink carrier frequency F1' while a UE 120 (including D2D-UEs 120c.1 and 120c.2) may perform uplink signal and/or physical channel(s) transmission on the same carrier frequency.

In the direct communication mode 330, the direct communication function 332 of paired D2D-UEs 120c.1 and 120c.2 is enabled. Among the paired D2D-UEs 120c.1 and 120c.2, on a specific sub-frame in a radio frame, only one D2D-UE (either 120c.1 or 120c.2) performs D2D transmission 334 while the other D2D-UE (120c.2 or 120c.1 respectively) performs reception 335 on the network configured shared/dedicated downlink resource 333 in direct communication sub-mode (330.a), or on the network configured shared/dedicated uplink resources (333.b) in direct communication sub-mode (330.b), or on dedicated resources for direct communication (F1, F1' or F3), as discussed above. Direct communication role switching 336 (e.g. so that which of the D2D-UEs performs D2D transmission and D2D reception, respectively, swaps), is allowed on a sub-frame basis according to a timing pattern negotiated between paired D2D-UEs.

Since D2D capable FDD-UEs have a full duplexer that enables them to perform concurrent transmission and reception on different carrier frequencies:

if cellular DL resource 333 is configured for direct communication (shared or dedicated) such as D2D sub-mode 330.a, for a D2D-UE that takes a role in direct communication reception 335 on a particular sub-frame, such as D2D-UE 120c.2, that D2D-UE may optionally be configured to perform cellular UL physical channel(s) and/or signal transmission 313 to the eNB 110a on cellular UL carrier frequency F1' on the same sub-frame.

if cellular UL resource 333.b is configured for direct communication (shared or dedicated) such as D2D sub-mode 330.b, for a D2D-UE that takes a role in direct communication transmission 334 on a particular subframe, such as D2D-UE 120c.1, that D2D-UE may optionally be configured to perform cellular DL physical channel(s) and/or signal monitoring or reception 313.b from the eNB 110a on cellular DL carrier frequency F1 on the same subframe.

The proposed optionally configured cellular UL transmission or DL reception feature during D2D direct communication for D2D capable FDD-UEs may assist with latency reduction in D2D reporting and reconfiguration, especially for the case where D2D-UEs forming a pair for direct communication belong to different cellular networks. This will be discussed further below.

As above, D2D-UEs will use cellular network DL frame, subframe and symbol timing as reference timing for D2D transmission 334 and D2D reception 335.

Figure 5:
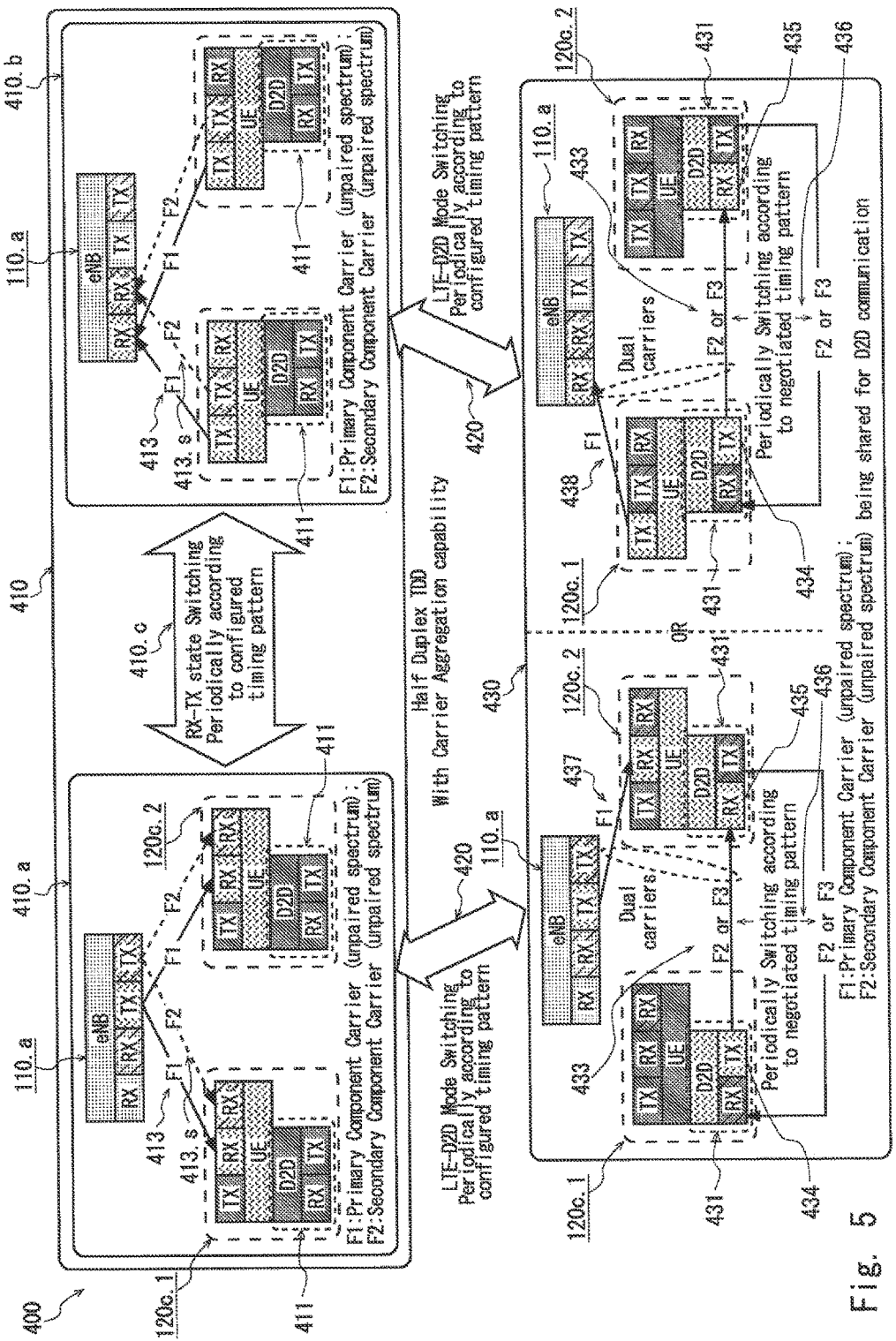
FIG. 5 illustrates an example mode transition diagram for a D2D capable LTE-TDD system with carrier aggregation.

FIG. 5 shows an example mode transition diagram for a D2D capable LTE-TDD system with carrier aggregation (CA). In FIG. 5, the system is denoted generally by reference numeral 400. Presently proposed for supporting direct communication, with reference to FIG. 5, is a "direct communication mode" 430, which is in addition to the current cellular TDD communication mode with CA 410, and a method for periodic switching 420 to and from "cellular communication mode" 410, while maintaining D2D-UE(s) in RRC_CONNECTED on PCell for control connectivity with the overlaid cellular network.

In the cellular TDD communication mode 410, by following the same rule defined for TDD system 200 without CA above, the direct communication function 411 of paired D2D-UEs (e.g. 120c.1 and 120c.2) is disabled. According to 3GPP LTE-A, in the downlink transmission state 410.a an access node 110a with CA (such as an eNB) may perform downlink signal and/or physical channel(s) transmission on cellular downlink resources 413 on primary carrier component (PCC) F1, and maybe on cellular aggregated downlink resources 413.s on secondary carrier component (SCC) F2, while UEs 120 (including paired D2D-UEs 120c.1 and 120c.2) may perform signal and/or physical channel(s) monitoring or reception on the same carrier components PCC and SCC respectively. Also according to current LTE-A, in the uplink transmission state 410.b, an access node with CA 110a (such as an eNB) may perform uplink signal and/or physical channel(s) reception on cellular uplink resources 413 on primary carrier component (PCC) F1, and maybe on cellular aggregated uplink resources 413.s on secondary carrier component (SCC) F2, while UEs 120 (including paired D2D-UEs 120c.1 and 120c.2) may perform signal and/or physical channel(s) transmission on the same carrier components PCC and SCC respectively. Further according to current LTE and LTE-A, the transition 410.c between a downlink transmission state 410.a and an uplink transmission state 410.b happens on a sub-frame basis according to seven predefined UL-DL configuration patterns. Further still, current Rel'11 LTE also allows different UL-DL configurations to be configured on PCell and SCell(s).

In the proposed direct communication mode 430 in FIG. 5, the direct communication function 431 of paired D2D-UEs 120c.1 and 120c.2 is enabled. Among paired D2D-UEs 120c.1 and 120c.2, on a specific sub-frame, only one D2D-UE (either 120c.1 or 120c.2) performs D2D transmission 434 while the other (120c.2 or 120c.1 respectively) performs reception 435 on a network configured resource. Direct communication role switching 436 is allowed on a sub-frame basis according to negotiated timing pattern between paired D2D-UEs.

Since D2D capable TDD-UEs with CA are able to perform either reception or transmission on more than one carrier component:

if a network configured resource 433 for direct communication is the cellular PCell's resource, then direct communication will follow the rule defined for D2D capable LTE-TDD system without CA. That is, no cellular communication is allowed in direct communication mode 430.

if a network configured resource 433 for direct communication is the cellular SCell's resources F2 or a dedicated D2D resource F3, for a D2D-UE that takes a role in direct communication reception 435 on a particular sub-frame such as D2D-UE 120c.2, that D2D-UE may optionally be configured to perform cellular DL physical channel(s) and/or signal monitoring or reception 437 from eNB 110a on cellular DL resource, on primary carrier component F1 in the same sub-frame.

if a network configured resource 433 for direct communication is the cellular SCell's resources F2 or dedicated D2D resource F3 433, for a D2D-UE that takes a role in direct communication transmission 434 on a particular sub-frame such as D2D-UE 120c.1, that D2D-UE may optionally be configured to perform cellular UL physical channel(s) and/or signal transmission 438 to eNB 110a on cellular UL resource, on primary carrier component F1 in the same sub-frame.

The proposed optionally configured cellular UL transmission or DL reception feature during D2D direct communication for D2D capable TDD-UEs with CA may assist with latency reduction in D2D reporting and reconfiguration, especially for the case where D2D-UEs forming a pair for direct communication belong to different cellular networks. This will be discussed further below.

As above, D2D-UEs will use cellular network DL frame, subframe and symbol timing as reference timing for D2D transmission 434 and D2D reception 435.

Figure 6:
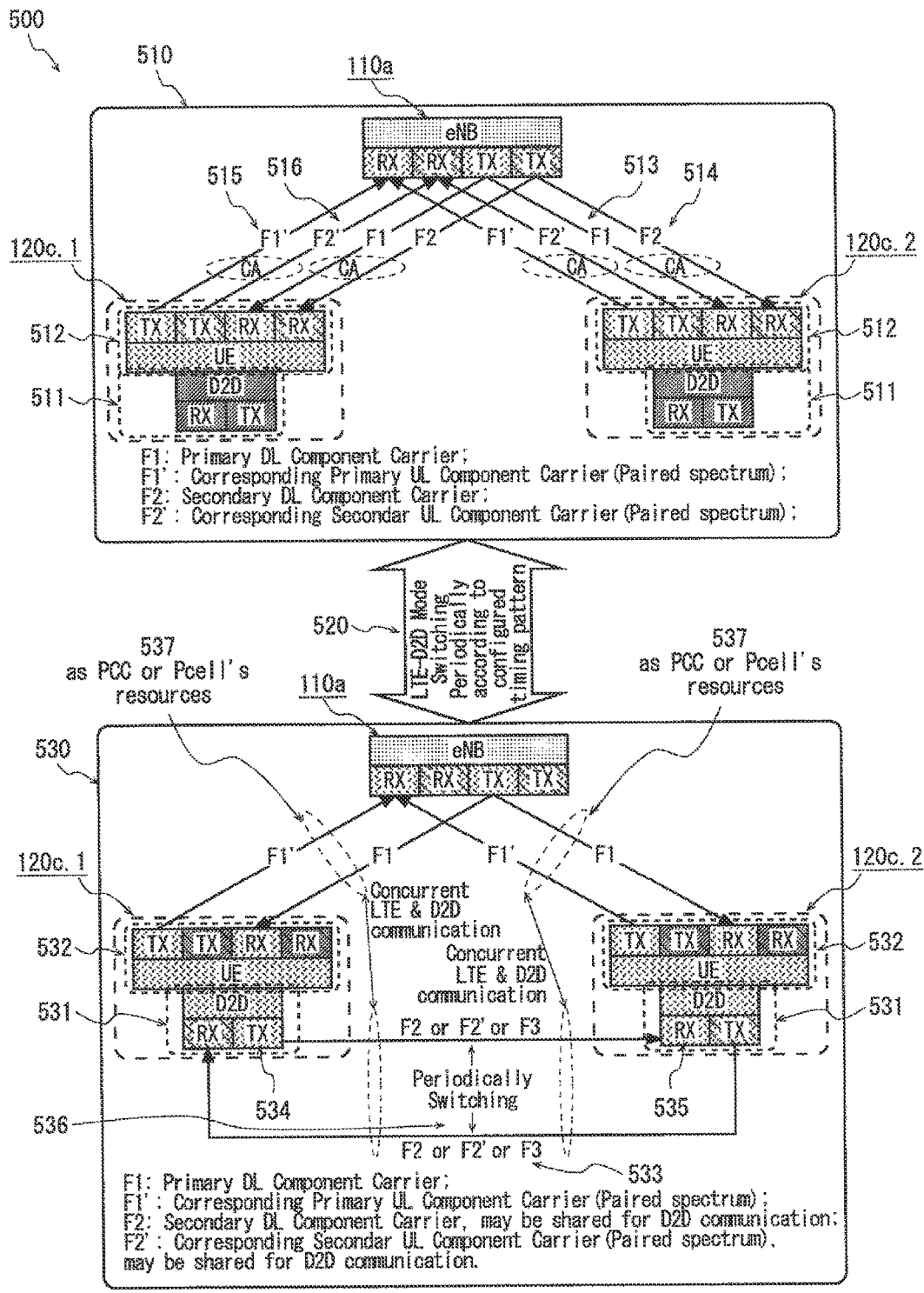
FIG. 6 illustrates an example mode transition diagram for a D2D capable LTE-FDD system with carrier aggregation.

FIG. 6 shows an example mode transition diagram for a D2D capable LTE-FDD system with carrier aggregation (CA). In FIG. 6, the system is denoted generally by reference numeral 500. Presently proposed for supporting direct communication, with reference to FIG. 6, is a "direct communication mode" 530, which is in addition to current cellular FDD communication mode with CA 510, and a method for periodic switching (520) to and from "cellular communication mode" (510), while maintaining D2D-UE(s) in RRC_CONNECTED on PCell for control connectivity with the overlaid cellular network(s).

In the cellular FDD communication mode 510, by following the same rule defined for TDD system 400 above, the cellular communication function 512 of paired D2D-UEs 120c.1 and 120c.2 is enabled, and the direct communication function 511 of paired D2D-UEs 120c.1 and 120c.2 is disabled. According to 3GPP LTE-A, an access node 110a (such as an eNB) may perform downlink signal and/or physical channel(s) transmission on cellular primary downlink resources 513 on Primary carrier component (PCC) F1. Access node 110a may also perform downlink signal and/or physical channel(s) transmission on cellular secondary downlink resources 514 on aggregated secondary carrier component F2. UEs 120 (including paired D2D-UEs 120c.1 and 120c.2) may perform signal and/or physical channel(s) monitoring or reception on the Primary DL carrier component and Secondary DL carrier component(s). An access node 110a (such as an eNB) may also perform uplink signal reception and/or physical channel(s) reception on cellular primary uplink resources (515) and cellular secondary uplink resources (516) on pairing uplink carrier frequency F1' and F2' respectively, while UEs 120 (including D2D-UEs 120c.1 and 120c.2) may perform uplink signal and/or physical channel(s) transmission on the same Primary UL carrier component and Secondary UL carrier component(s).

In the proposed direct communication mode 530 in FIG. 6, the direct communication function 531 of paired D2D-UEs 120c.1 and 120c.2 is enabled. Also, among paired D2D-UEs 120c.1 and 120c.2, on a specific sub-frame, only one D2D-UE (either 120c.1 or 120c.2) performs D2D transmission 534 while the other D2D-UE (120c.2 or 120c.1 respectively) performs the reception 535 on the network configured resources.

In performing D2D transmission 534 or D2D reception 535, D2D-UEs will use cellular network DL frame, sub-frame and symbols timing as reference timing.

Since D2D capable FDD-UEs with CA are able to perform reception and transmission on more than one carrier component:

if a network configured resource 533 for direct communication is the cellular PCell's resource (either UL or DL resources), then direct communication will follow the rule defined for D2D capable LTE-TDD and LTE-FDD system without CA.

if a network configured resource 533 for direct communication is the cellular SCell's resources F2/F2' or a dedicated D2D resource F3, for a D2D-UE that takes a role either in direct communication transmission 534 or reception 535 on a particular sub-frame, that D2D-UE may optionally be configured to perform cellular UL physical channel(s) and/or signal transmission and cellular DL physical channel(s) and/or signal monitoring or reception 537 to and from eNB 110a respectively on cellular primary carrier component F1/F1' in the same sub-frame.

The proposed optionally configured cellular UL transmission and DL reception feature during D2D direct communication for D2D capable FDD-UEs with CA may assist in providing dual mode connectivity. That is, concurrent cellular mode and D2D mode, where, the cellular mode allows a D2D-UE (or other D2D capable device) to maintain connectivity with the mobile network's RRC on the control plane and also allows it to maintain connectivity with the mobile network on the user plane, and the D2D mode allows paired D2D-UEs (or other D2D capable devices) to exchange user-plane data with each other directly on cellular network configured resources.

Also proposed herein are architectures of a D2D-UE's transmitter and receiver without and with CA.

Figure 7:
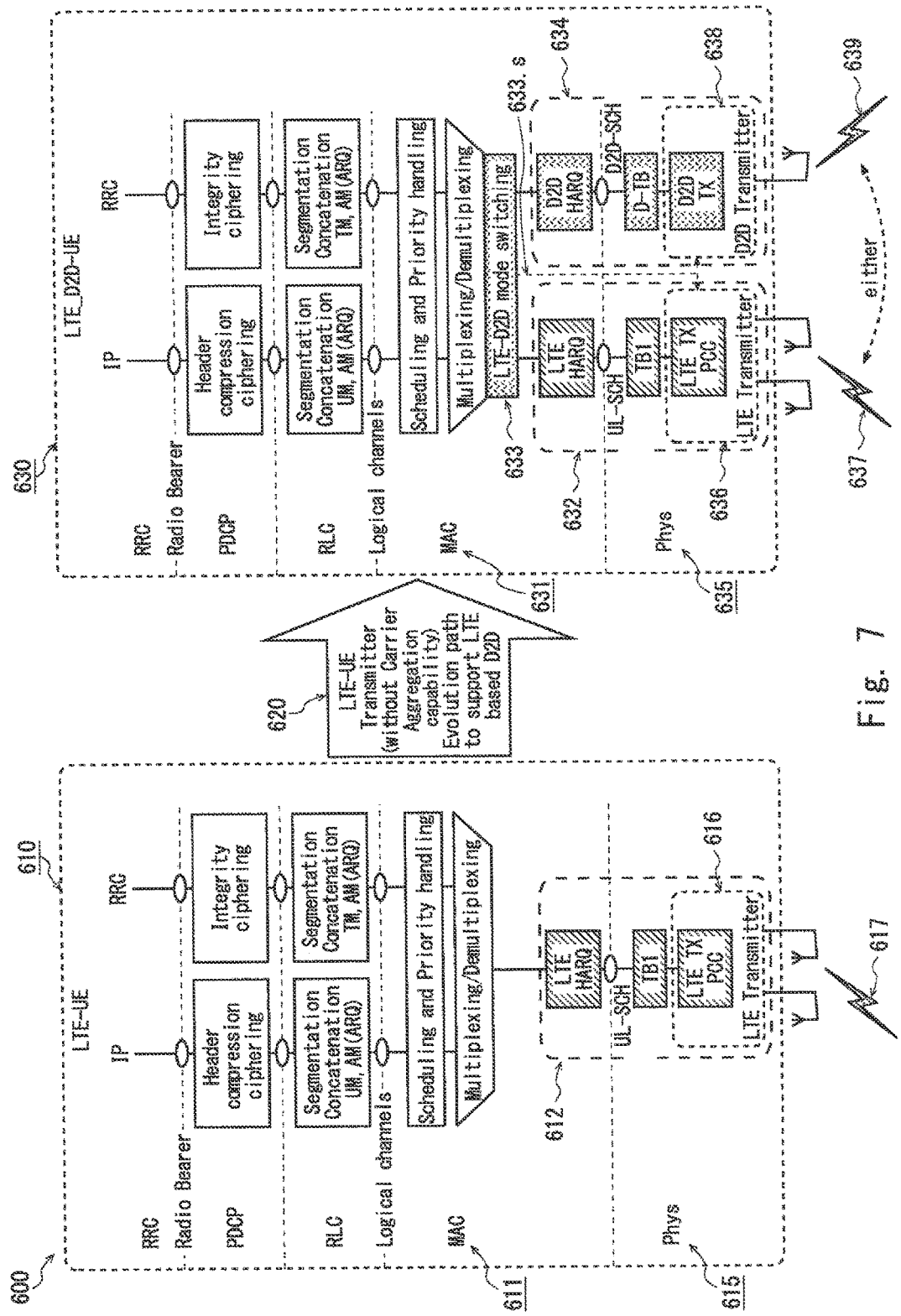
FIG. 7 illustrates an architecture evolution to create an architecture for a D2D-UE's transmitter based on a legacy LTE-UE's transmitter without carrier aggregation.

FIG. 7 illustrates a transmitter architecture evolution for supporting D2D in case of non carrier aggregation. FIG. 7 illustrates an architecture evolution 600 to create the proposed architecture for a D2D-UE's transmitter 630 based on legacy LTE-UE's transmitter without CA 610. According to 3GPP LTE without CA, a basic LTE-UE transmitter architecture 610 includes key layers PDCP, RLC, MAC and Phys layers. Among these layers, according to the proposal in FIG. 7, MAC layer 611 with a single HARQ entity 612 for serving cell and Phys layer 615 with LTE transmitter 616 are modified to support direct communication. Specifically, they are modified by adding:

One or more HARQ entities for direct communication, and

An LTE-D2D mode switching entity for:

Selecting appropriate HARQ entities and managing the selected HARQ entity for direct communication or cellular communication, and Providing Control signalling in selecting appropriate transmitter for direct communication or cellular communication with time.

Thus, the proposed D2D-UE transmitter architecture 630 in FIG. 7 includes:

1. A newly proposed MAC layer 631 with:
   a. A D2D HARQ entity 634 for direct communication in addition to the existing HARQ entity 632 for cellular communication, and
   b. A LTE-D2D mode switching entity 633 for selecting appropriate HARQ entity (632 or 634) and providing control signal 633.s for selecting appropriate transmitter (636 or 638) for either cellular or direct communication with time.
2. A Newly proposed Phys layer 635 with added D2D transmitter 638 for direct communication operating on D2D allocated resources 639, in addition to the existing LTE transmitter 636 for cellular UL communication on cellular allocated resource 637.

Figure 8:
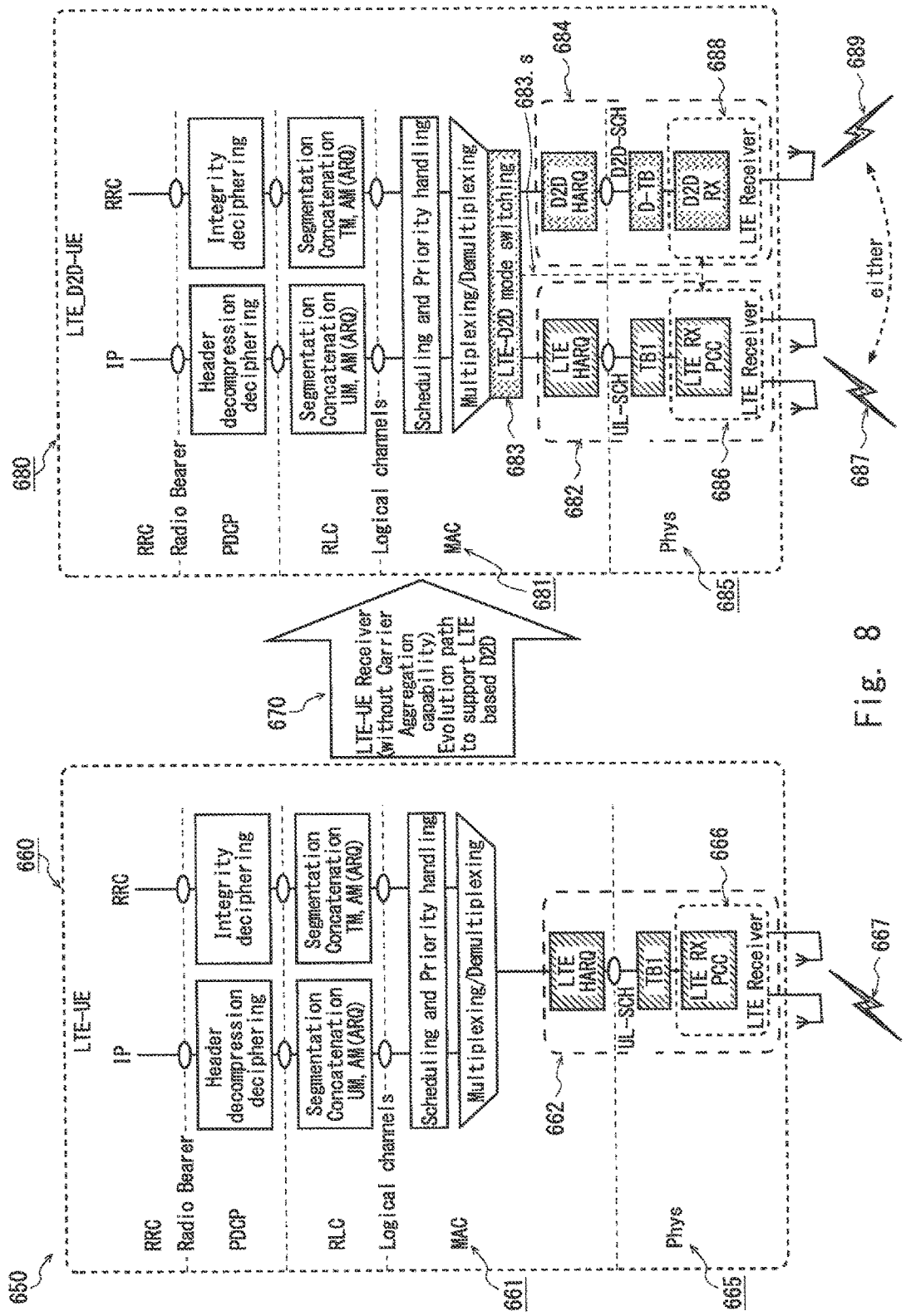
FIG. 8 illustrates an architecture evolution to create an architecture for a corresponding D2D-UE's receiver based on a legacy LTE-UE's receiver without carrier aggregation.

FIG. 8 illustrates a receiver architecture evolution for supporting D2D in case of non carrier aggregation. FIG. 8 illustrates an architecture evolution 650 to create a proposed architecture for a corresponding D2D-UE's receiver 680 based on a legacy LTE-UE's receiver without CA 660. According to current LTE without CA, a basic LTE-UE receiver architecture 660 includes key layers of PDCP, RLC, MAC and Phys layers. Among these layers, according to the proposal in FIG. 8, MAC layer 661 with a single HARQ entity 662 for handling serving cell's transport channel reception and Phys layer 665 with LTE receiver 666 for handling serving cell's signals & physical channel(s), are modified to support direct communication. Specifically, they are modified by adding:

One or more HARQ entities for handling transport channels in direct communication, and A LTE-D2D mode switching entity for:

Selecting appropriate HARQ entities and managing the selected HARQ entity for direct communication or cellular communication, and Providing Control signalling in selecting appropriate receiver for direct communication or cellular communication with time.

Thus, the proposed D2D-UE receiver architecture 680 in FIG. 8 includes:

1. A Newly proposed MAC layer 681 with:
   a. A D2D HARQ entity 684 for handling transport channel reception in direct communication in addition to the existing HARQ entity 682 for handling transport channels reception in cellular communication, and
   b. A LTE-D2D mode switching entity 683 for selecting appropriate HARQ entity (682 or 684) and providing control signal 683.s for selecting appropriate receiver (686 or 688) for either cellular or direct communication with time.
2. Newly proposed Phys layer 685 with D2D receiver 688 for direct communication operating on D2D allocated resources 689, in addition to the existing LTE receiver 686 for cellular communication on cellular DL allocated resource 687.

Figure 9:
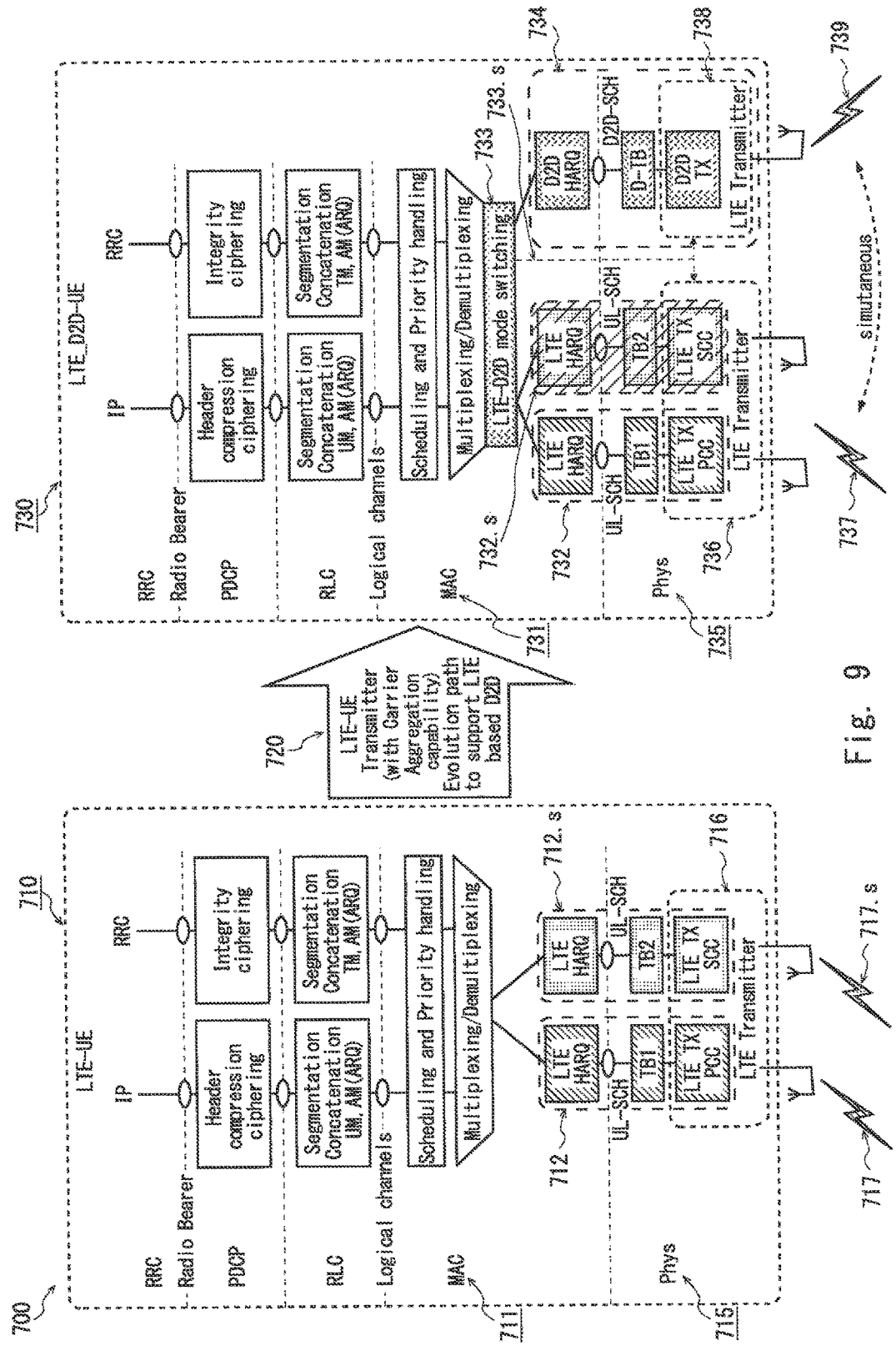
FIG. 9 illustrates an architecture evolution to create an architecture for a D2D-UE's transmitter based on a legacy LTE-UE's transmitter with carrier aggregation.

FIG. 9 illustrates a transmitter architecture evolution for supporting D2D in case of carrier aggregation. FIG. 9 illustrates an architecture evolution 700 to create a proposed architecture for a D2D-UE's transmitter 730 based on a legacy LTE-UE's transmitter with CA 710. According to 3GPP LTE with CA, a basic LTE-UE transmitter architecture 710 includes key layers of PDCP, RLC, MAC and Phys layers. Among these layers, according to the proposal in FIG. 9, MAC layer 711 with one HARQ entity 712 for primary serving cell (PCell) and one or more HARQ entities 712.s for secondary serving cell(s) (SCells), and Phys layer 715 with LTE transmitter 716, are modified to support direct communication. Specifically, they are modified by adding:

One or more HARQ entities for handling transport channels in direct communication, and A LTE-D2D mode switching entity for:

Selecting appropriate HARQ entities and managing the selected HARQ entity for direct communication or cellular communication, and Providing Control signalling in selecting appropriate receiver for direct communication or cellular communication with time.

Thus, the proposed D2D-UE transmitter architecture 730 in FIG. 9 includes:

1. A New MAC layer 731 with:
   a. A D2D HARQ entity 734 for direct communication in addition to the existing HARQ entities 732 and 732.s for cellular communication, and
   b. A LTE-D2D mode switching entity 733 for selecting appropriate HARQ entities 732 and/or 734 and providing control signal 733.s for selecting appropriate transmitter 736 and/or 738 for cellular and/or direct communication with time. (Note that HARQ entities 732.s for secondary serving cell(s) (SCells) must be turned off during direct communication. Since HARQ entities 732.s for secondary serving cell(s) (SCells) is disabled during direct communication, it may optionally be utilised for direct communication. Hence reducing implemented hardware resource)
2. A New Phys layer 735 with D2D transmitter 738 for direct communication operating on D2D allocated resources 739, in addition to the existing LTE transmitter 736 for cellular communication on cellular UL allocated resource 737.

Figure 10:
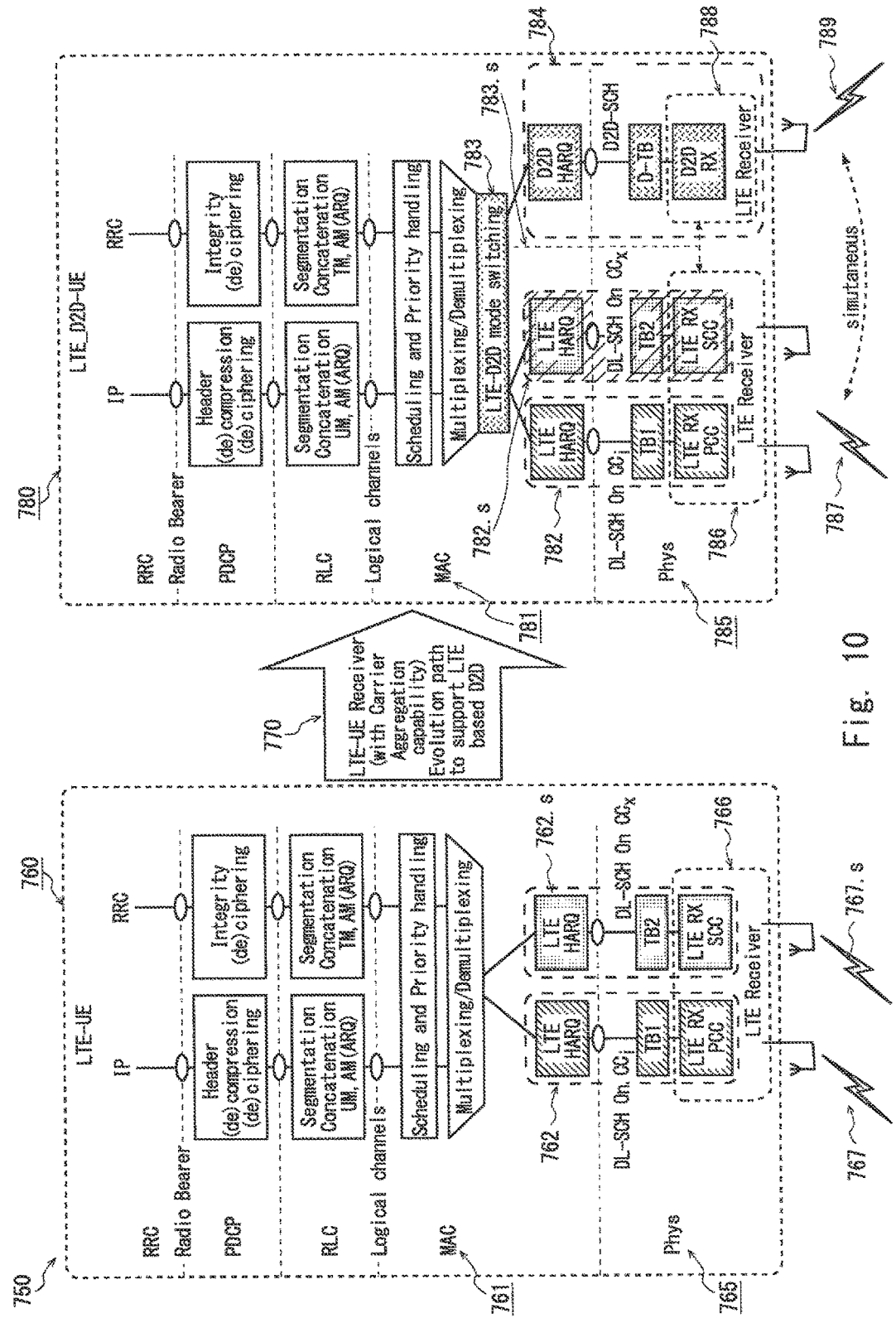
FIG. 10 illustrates an architecture evolution to create an architecture for a D2D-UE's receiver based on a legacy LTE-UE's receiver with carrier aggregation.

FIG. 10 illustrates a receiver architecture evolution for supporting D2D in case of carrier aggregation. FIG. 10 illustrates an architecture evolution 750 to create a proposed architecture for a corresponding D2D-UE's receiver 780 based on a legacy LTE-UE's receiver with CA 760. According to current LTE with CA, a basic LTE-UE receiver architecture 760 includes key layers of PDCP, RLC, MAC and Phys layers. Among these layers, according to the proposal in FIG. 10, MAC layer 761 with one HARQ entity 762 for handling transport channels from primary serving cell (PCell) and one or more HARQ entities 762.s for handling transport channels from secondary serving cell(s) (SCells), and Phys layer 765 with LTE receiver 766, are modified to support direct communication. Specifically, they are modified by adding:

One or more HARQ entities for handling transport channels in direct communication, and A LTE-D2D mode switching entity for:
   Selecting appropriate HARQ entities and managing the selected HARQ entities for direct communication and/or cellular communication. (Note that according to the proposals discussed above, up to two concurrent HARQ entities for direct communication and cellular communication are allowed for D2D-UE with CA capability), and
   Providing Control signalling in selecting appropriate receiver for reception of signals and/or physical channels in direct communication and/or cellular communication with time.

Thus, the proposed D2D-UE receiver architecture 780 in FIG. 10 includes:

1. A New MAC layer 781 with:
   a. A D2D HARQ entity 784 for handling transport channels in direct communication, in addition to the existing HARQ entities (782 and 782.s) for handling transport channels in cellular communication, and
   b. A LTE-D2D mode switching entity 783 for selecting appropriate HARQ entities 782 and/or 784 and providing control signal 783.s for selecting appropriate receiver 786 and/or 788 for cellular and/or direct communication with time. (Note that HARQ entities 782.s for secondary serving cell(s) (SCells) must be turned off during direct communication. Since HARQ entities 782.s for secondary serving cell(s) (SCells) are disabled during direct communication, they may optionally be utilised for direct communication.)
2. A New Phys layer 785 with D2D receiver 788 for direct communication operating on D2D allocated resources 789, in addition to the existing LTE receiver 786 for cellular communication on cellular DL allocated resource 787.

Figure 11:
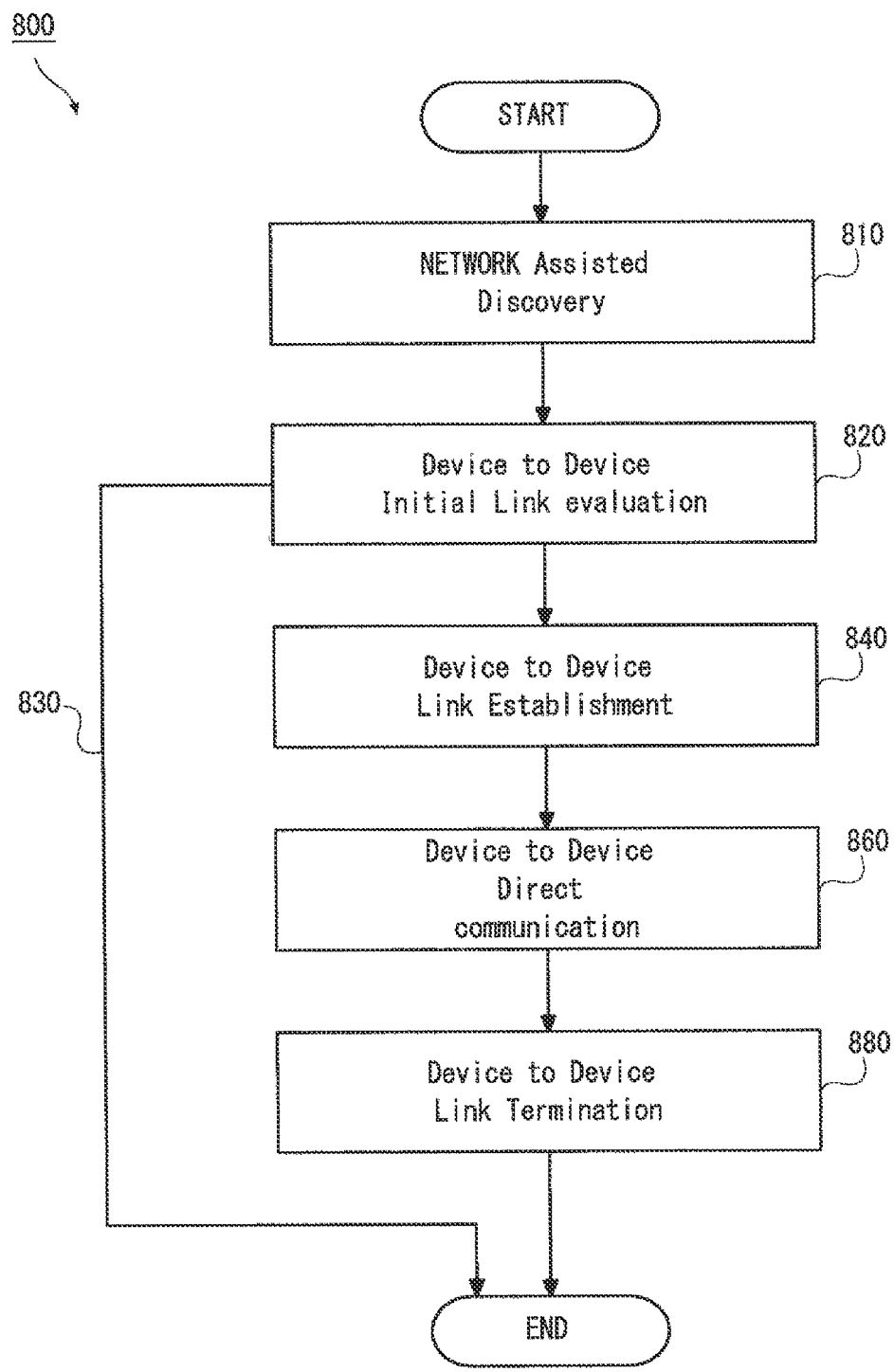
FIG. 11 illustrates a method for establishing and terminating direct communication under overlaid cellular network control with network assisted discovery.

Further proposed herein is a method for establishing and terminating direct communication under overlaid cellular network control with network assisted discovery. FIG. 11 illustrates a method for establishing and terminating direct communication under overlaid cellular network control with network assisted discovery. An embodiment of the method 800, illustrated in FIG. 11, may start with Network Assisted Discovery 810. The Network Assisted Discovery 810 may include a function for role negotiation, during which one D2D-UE may be assigned by its serving access node a role of GROUP OWNER or MASTER and the others may be assigned by the serving access node a role of CLIENT or SLAVE forming a direct communication pair or direct communication group. There may be more than one D2D-UEs assigned as CLIENT or SLAVE.

According to 3GPP LTE proximity-based services (ProSe), a cellular network may assist D2D discovery by initiating direct communication using geographical location information such as network based GPS. However, geographical location information may not truly reflect channel state information (CSI) between D2D-UEs forming a D2D pair, for example due to other factors such as possible shadowing, etc. Thus, the proposed method 800 may further include D2D Initial Link Evaluation 820 to measure the CSI of the D2D link for the cellular network to decide on whether to establish direct communication or continue with cellular communication.

Figure 12A:
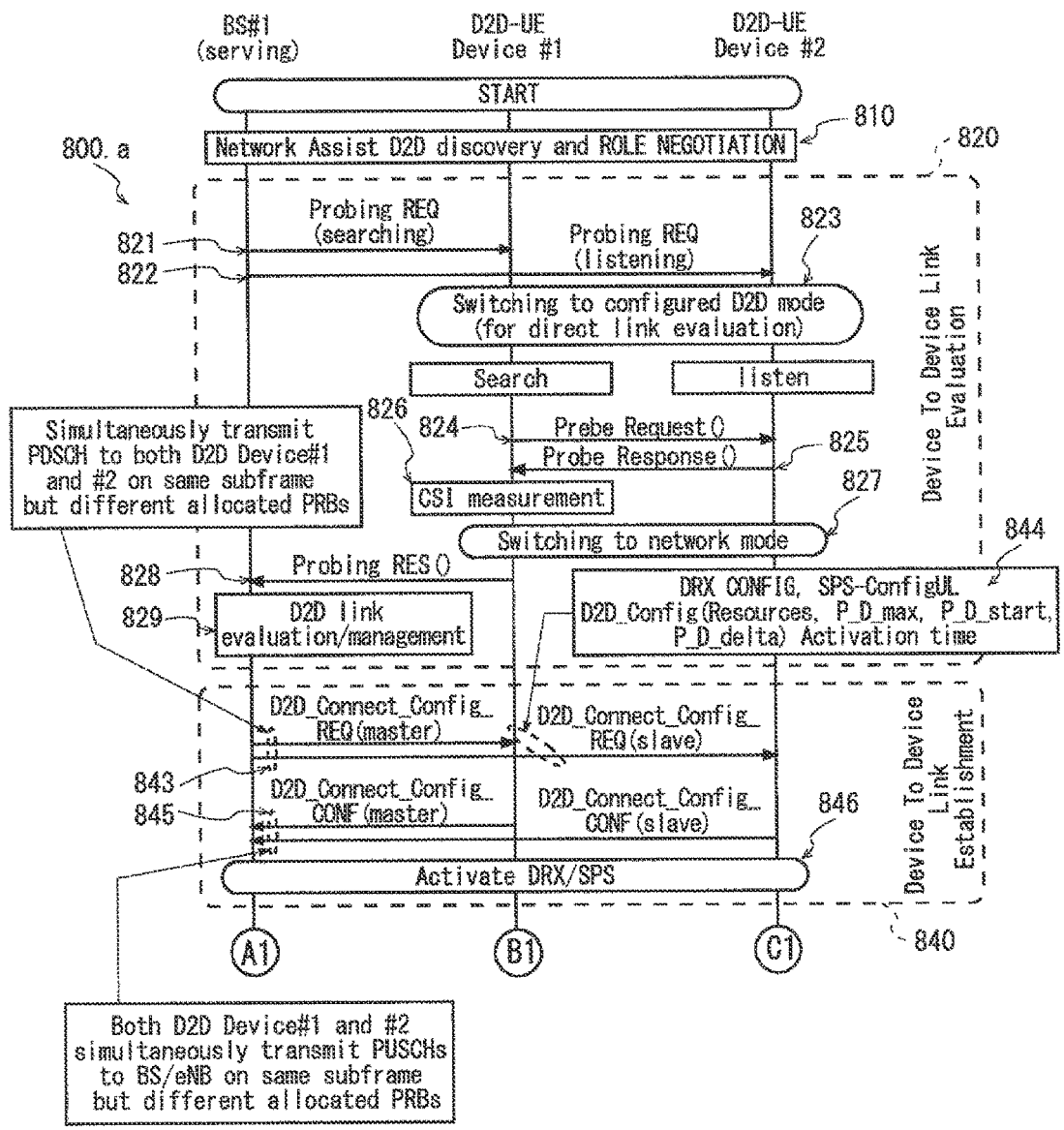
FIG. 12A helps to illustrate a direct communication establishment and termination procedure where D2D-UEs belong to a single access node.
Figure 12B:
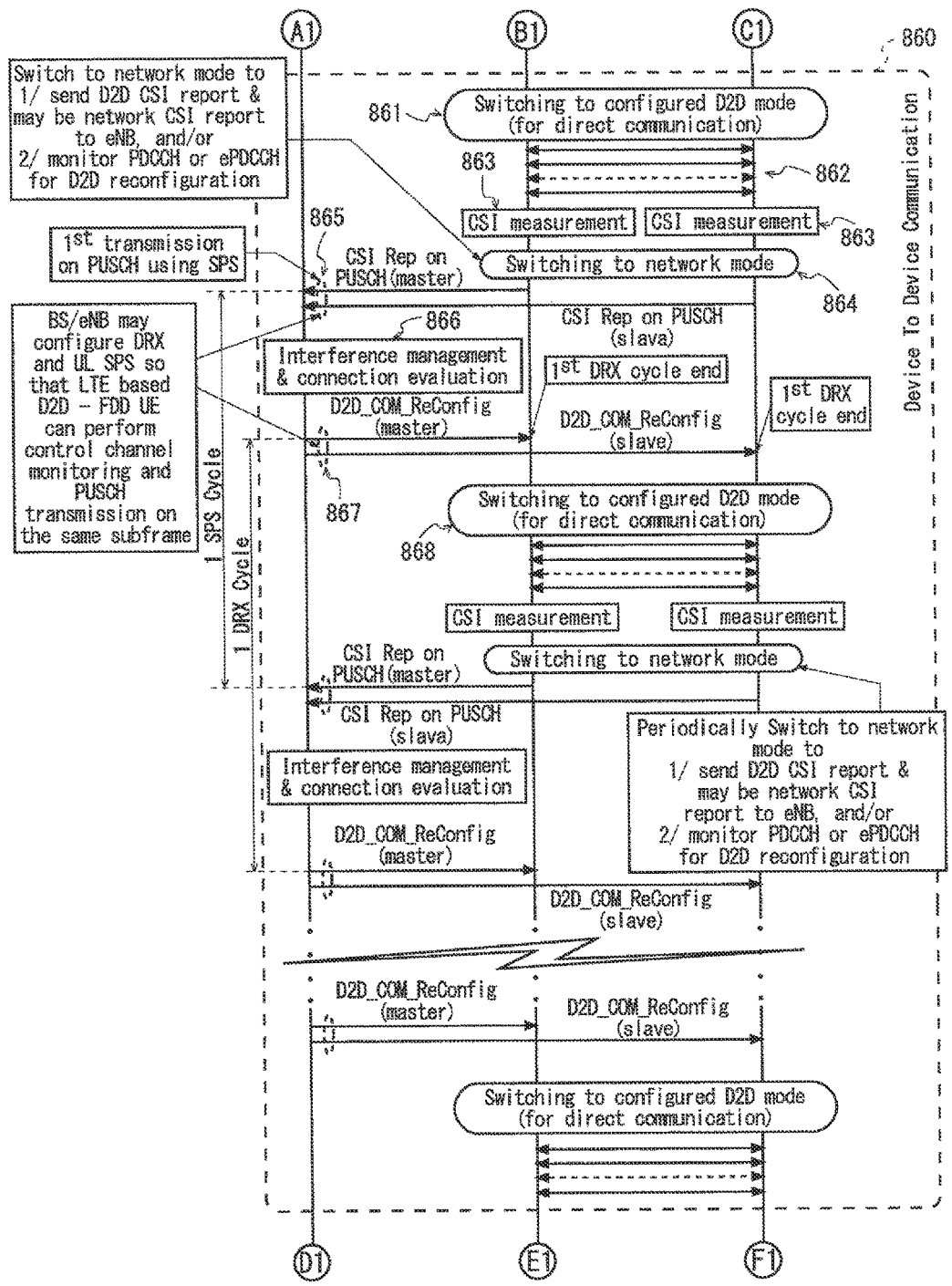
FIG. 12B helps to illustrate a direct communication establishment and termination procedure where D2D-UEs belong to a single access node.
Figure 12C:
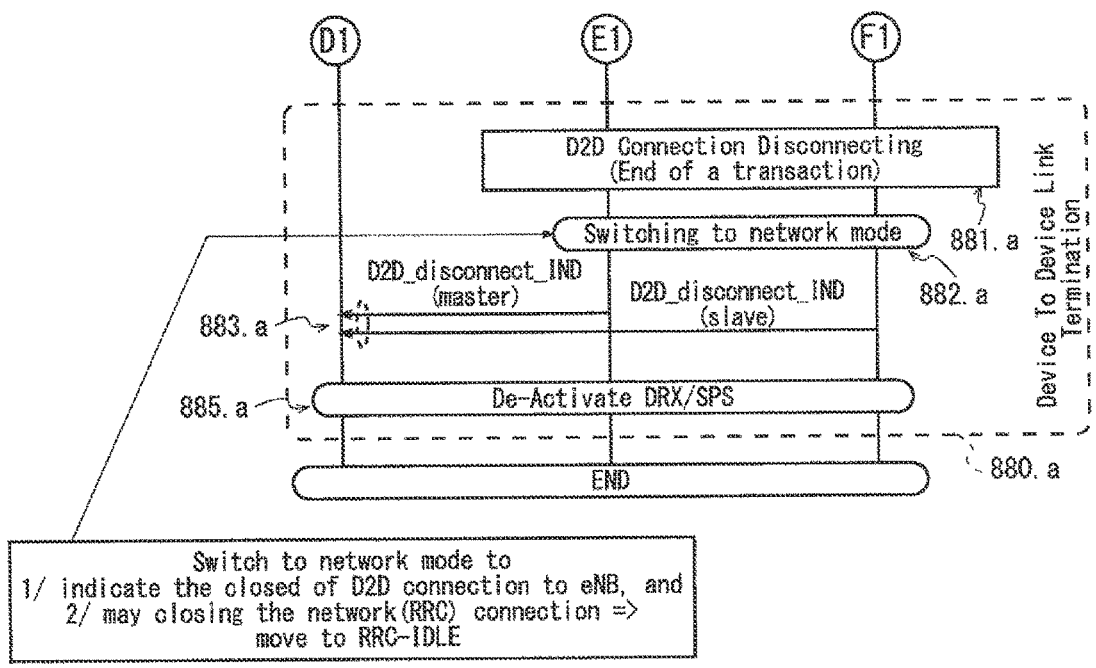
FIG. 12C helps to illustrate a direct communication establishment and termination procedure where D2D-UEs belong to a single access node.
Figure 13A:
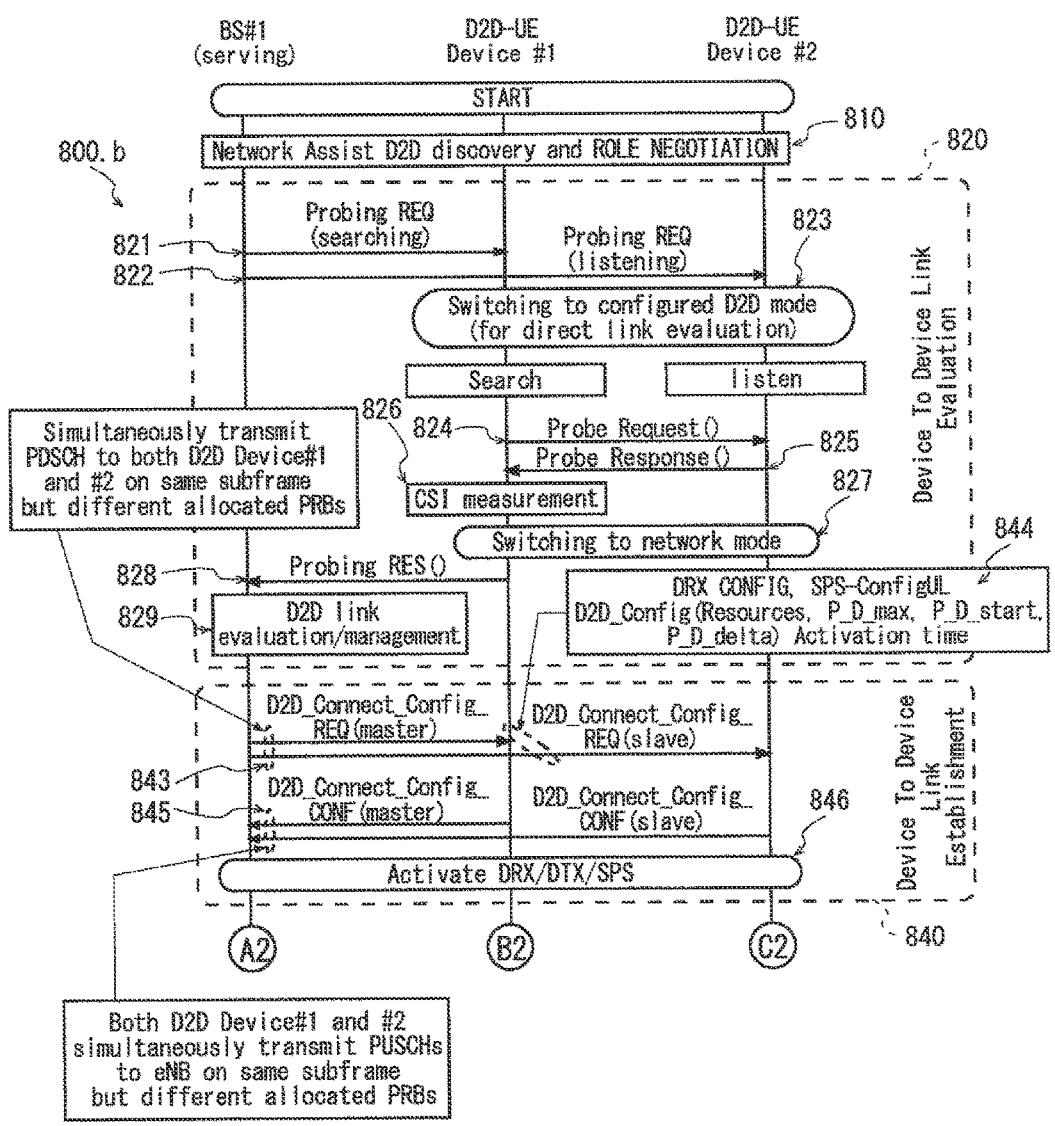
FIG. 13A helps to illustrate a direct communication establishment and termination procedure where D2D-UEs belong to a single access node and there is a D2D connection failure.
Figure 13B:
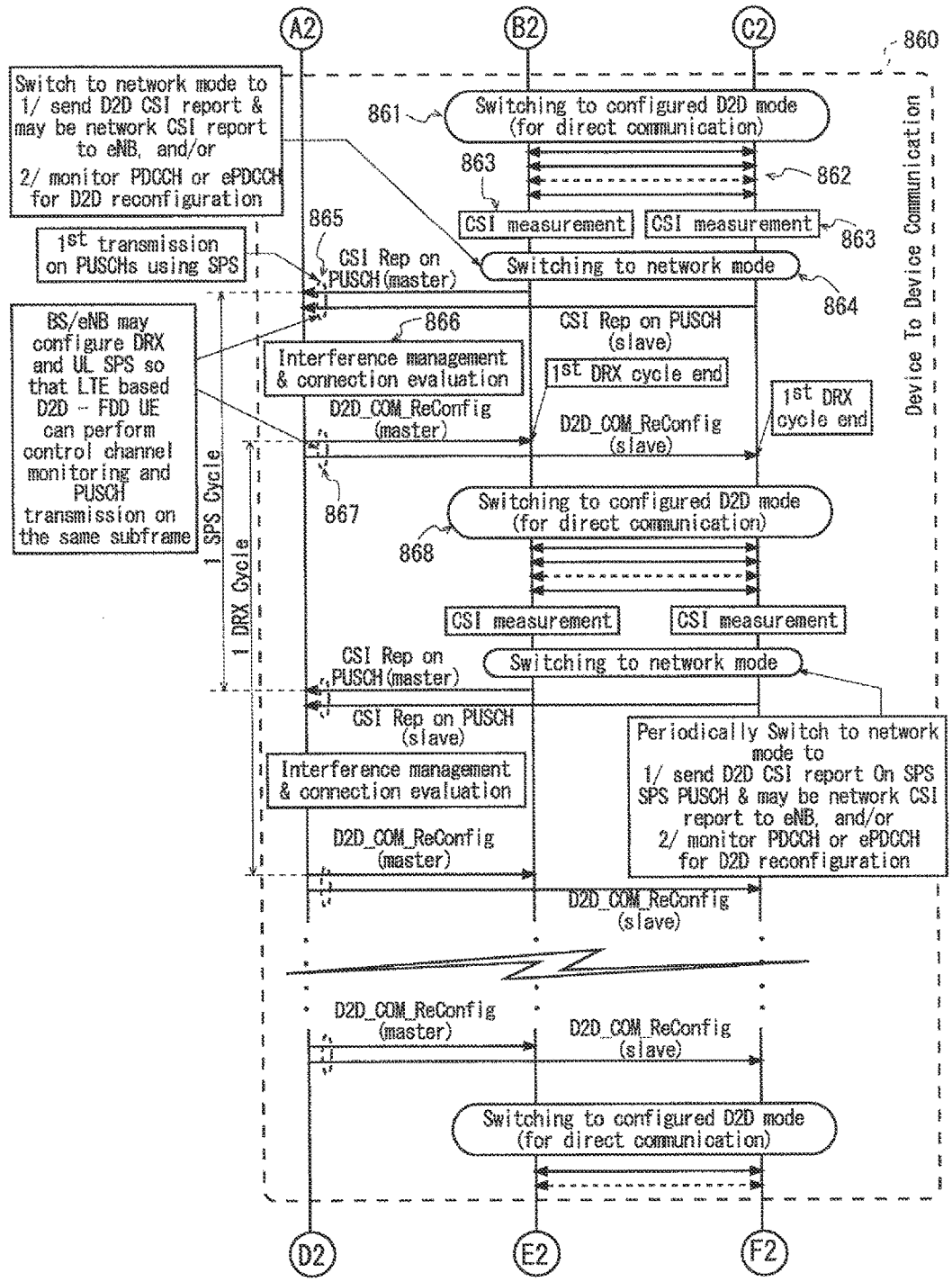
FIG. 13B helps to illustrate a direct communication establishment and termination procedure where D2D-UEs belong to a single access node and there is a D2D connection failure.
Figure 13C:
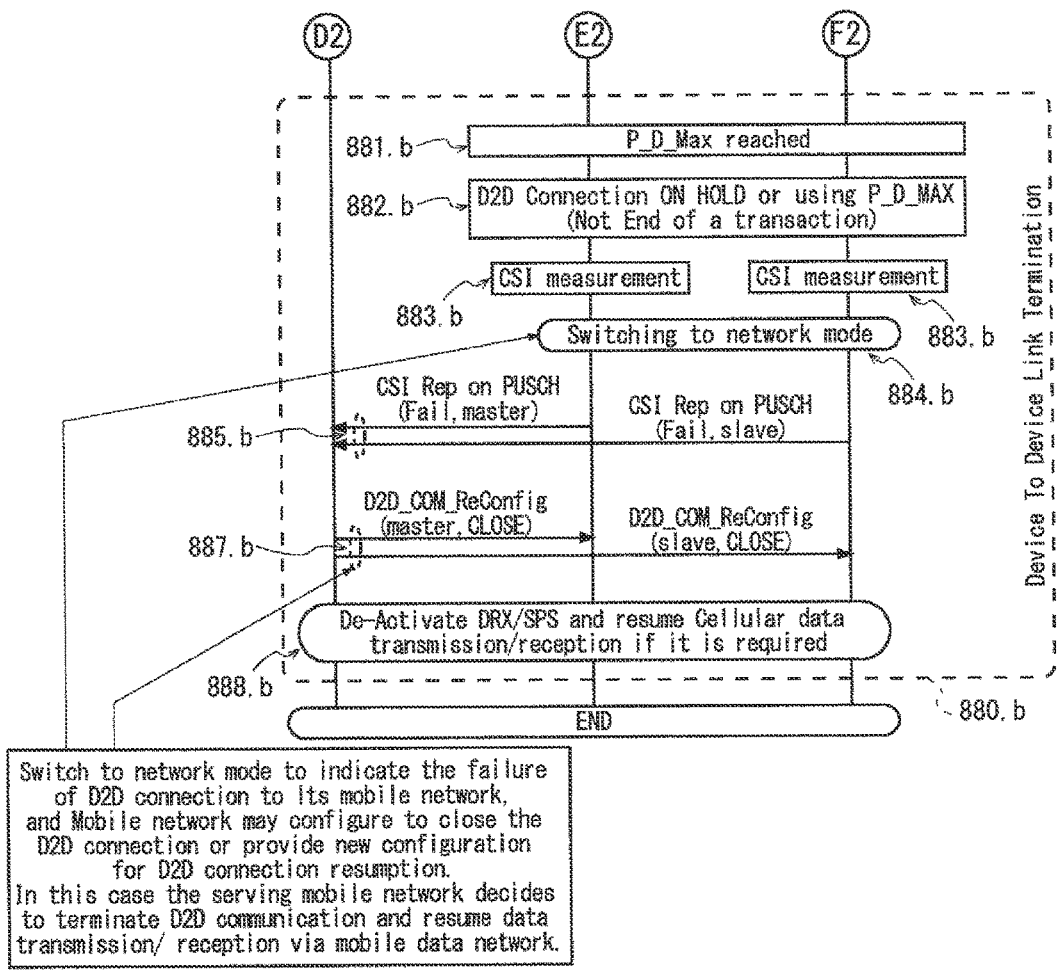
FIG. 13C helps to illustrate a direct communication establishment and termination procedure where D2D-UEs belong to a single access node and there is a D2D connection failure.
Figure 14A:
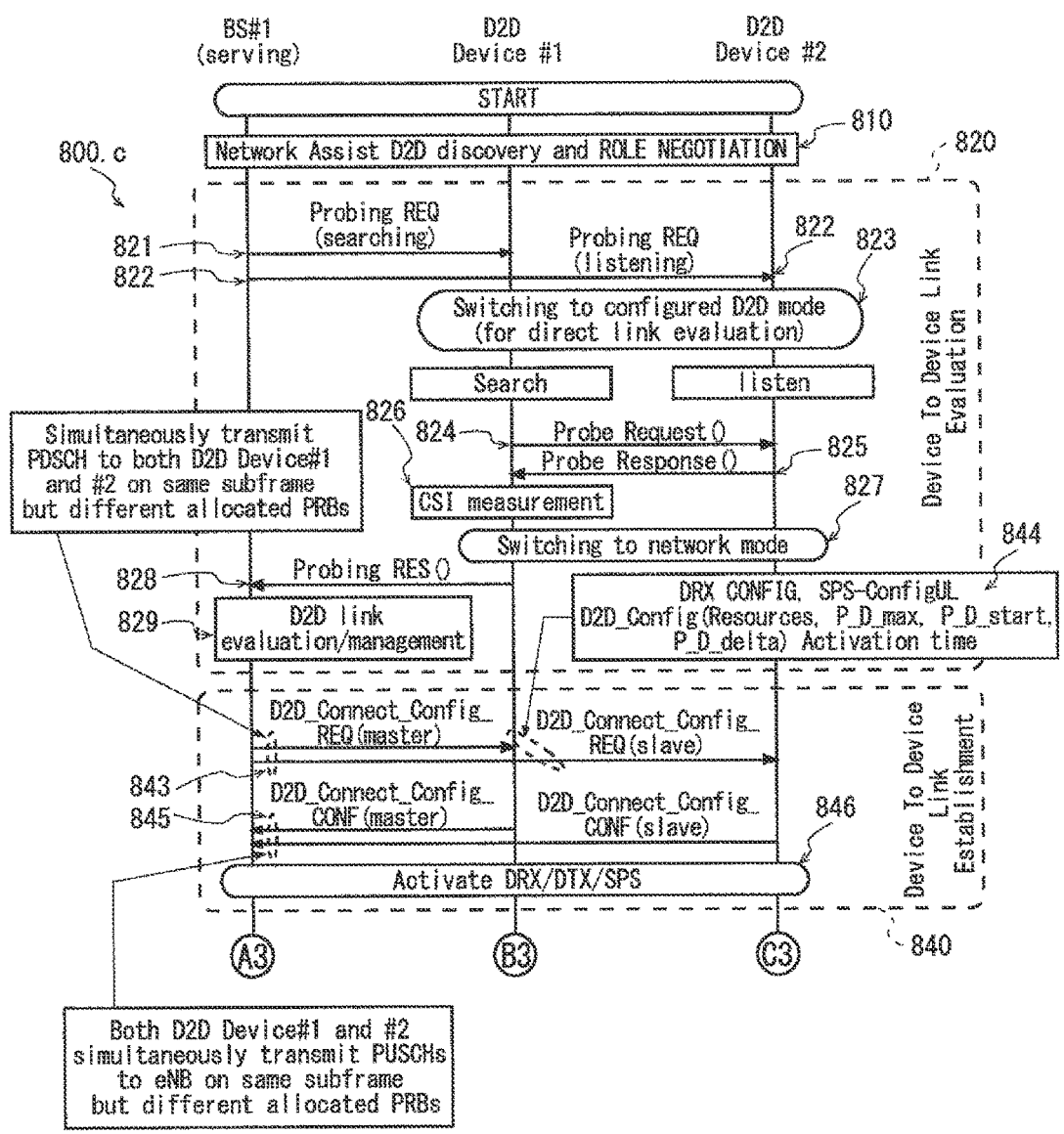
FIG. 14A helps to illustrate a direct communication establishment and termination procedure where D2D-UEs belong to a single access node and termination of the connection is initiated by the access node.
Figure 14B:
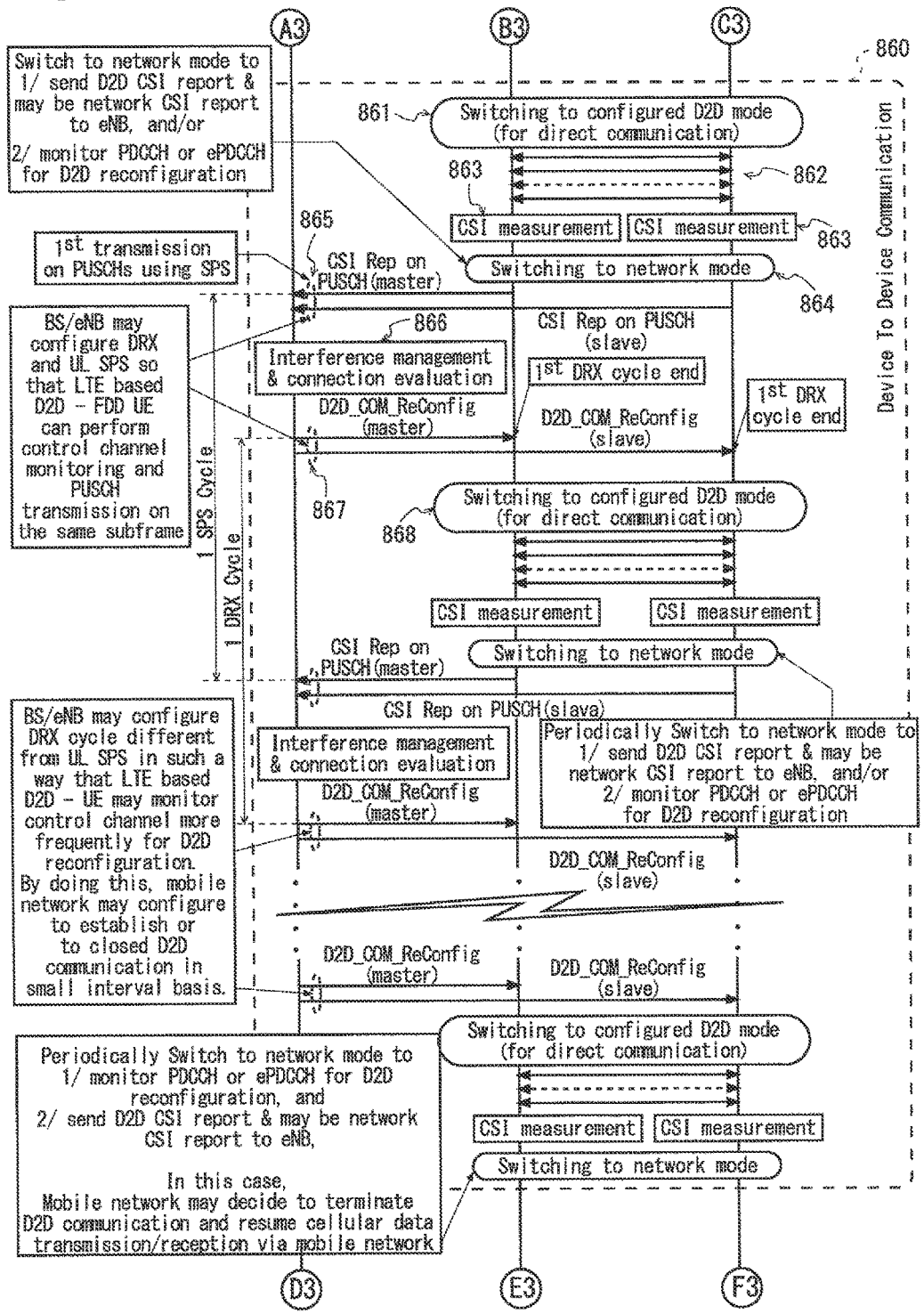
FIG. 14B helps to illustrate a direct communication establishment and termination procedure where D2D-UEs belong to a single access node and termination of the connection is initiated by the access node.
Figure 14C:
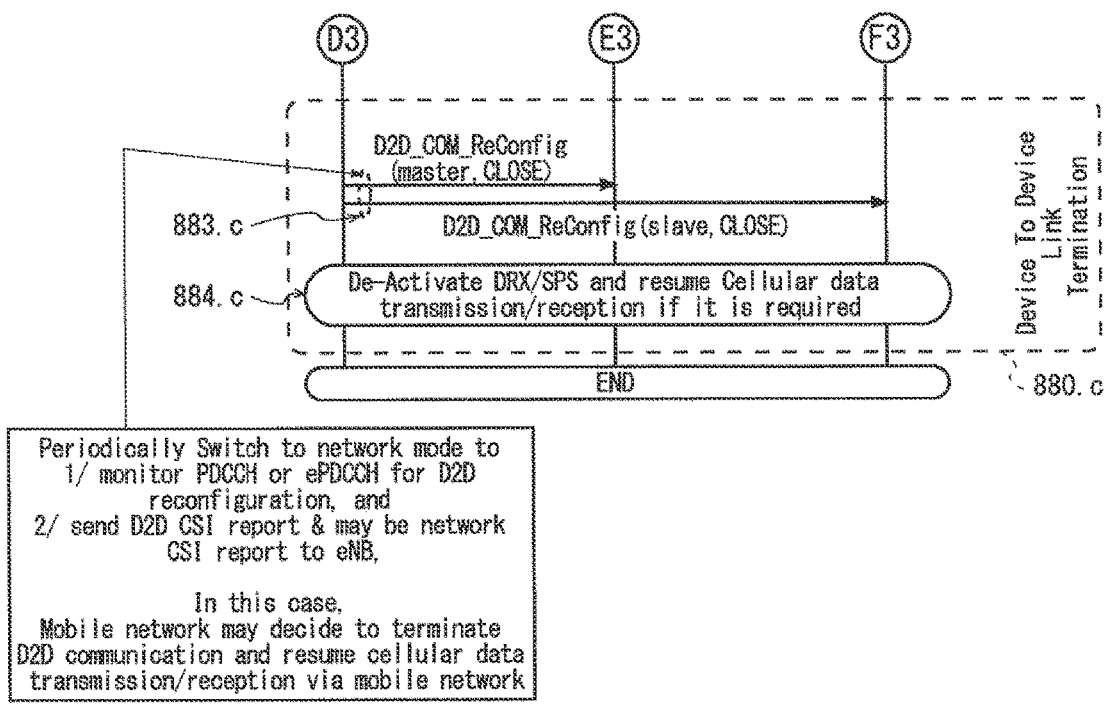
FIG. 14C helps to illustrate a direct communication establishment and termination procedure where D2D-UEs belong to a single access node and termination of the connection is initiated by the access node.
Figure 15A:
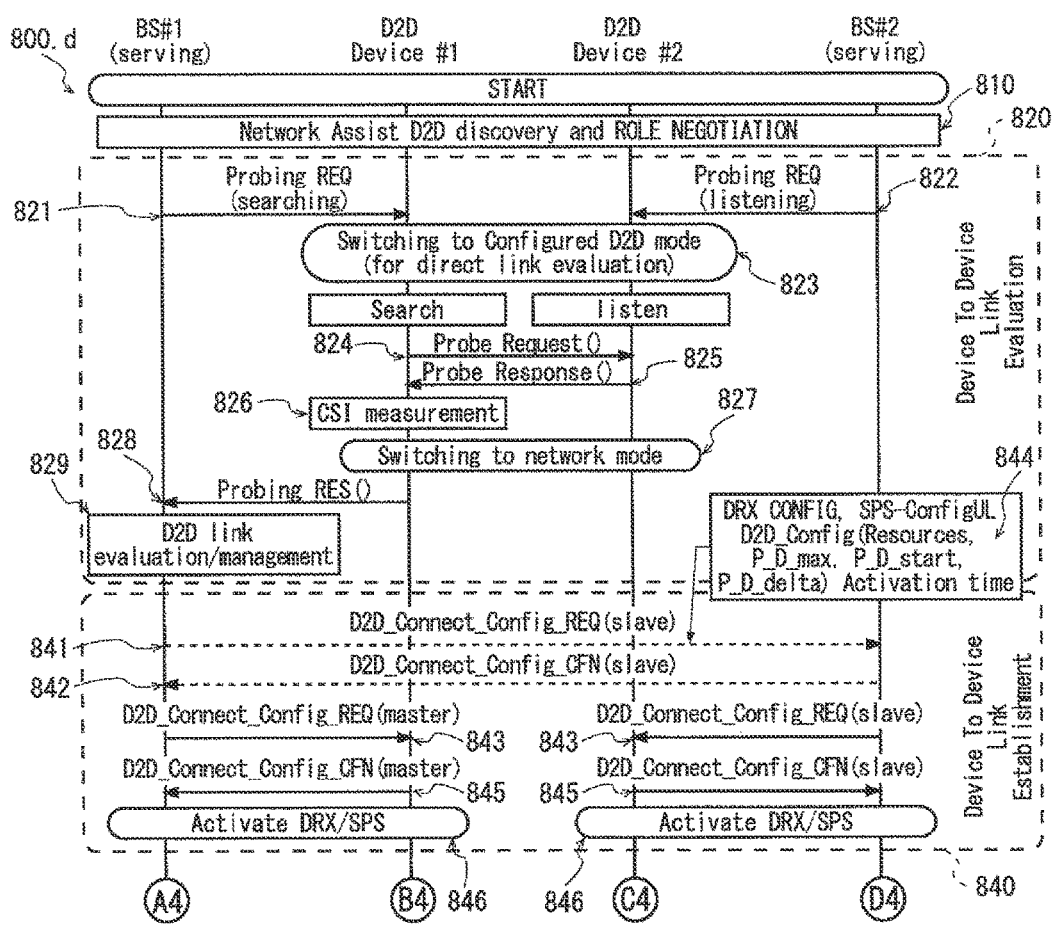
FIG. 15A helps to illustrate a direct communication establishment and termination procedure where D2D-UEs belong to multiple access nodes.
Figure 15B:
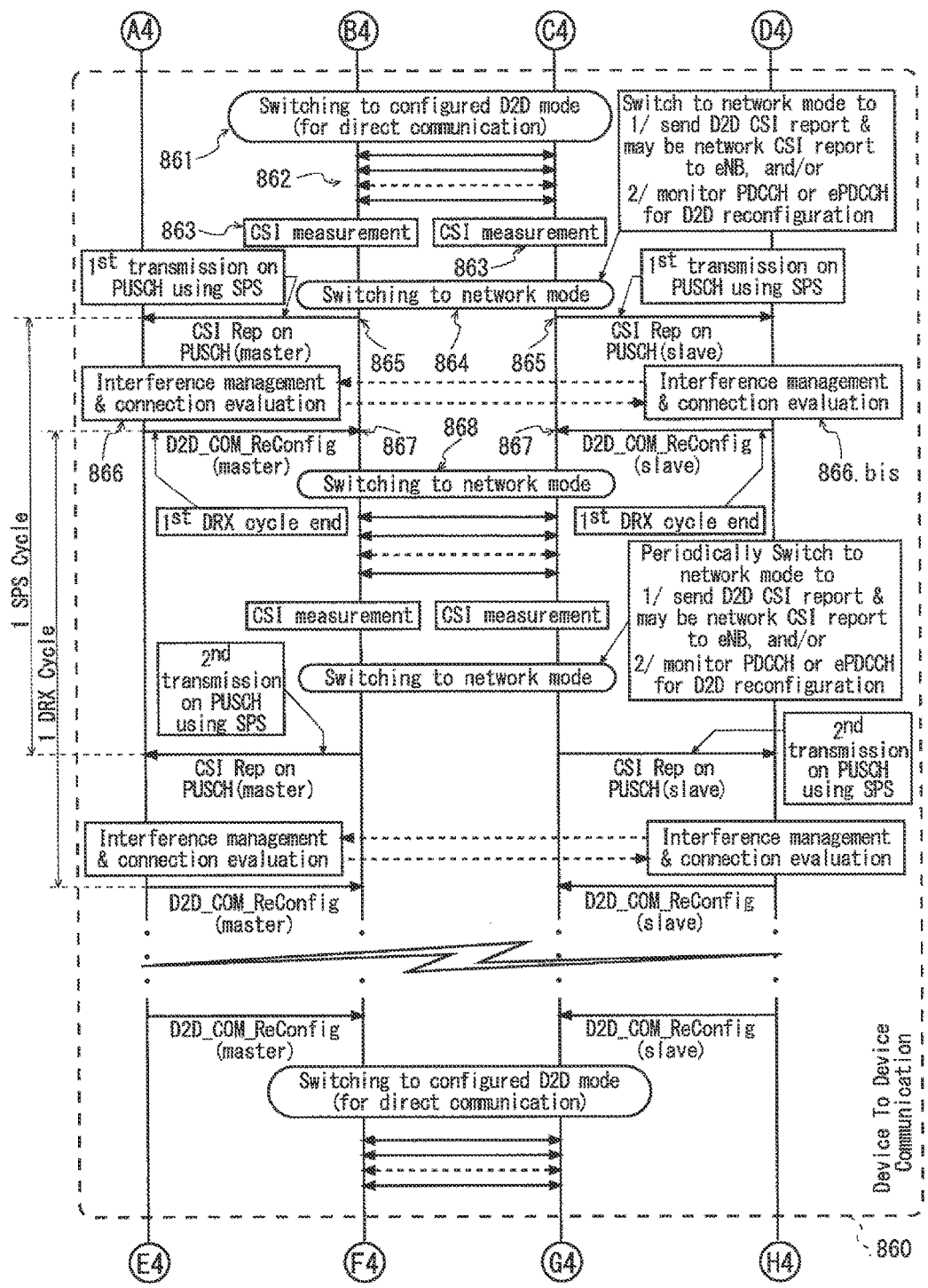
FIG. 15B helps to illustrate a direct communication establishment and termination procedure where D2D-UEs belong to multiple access nodes.
Figure 15C:
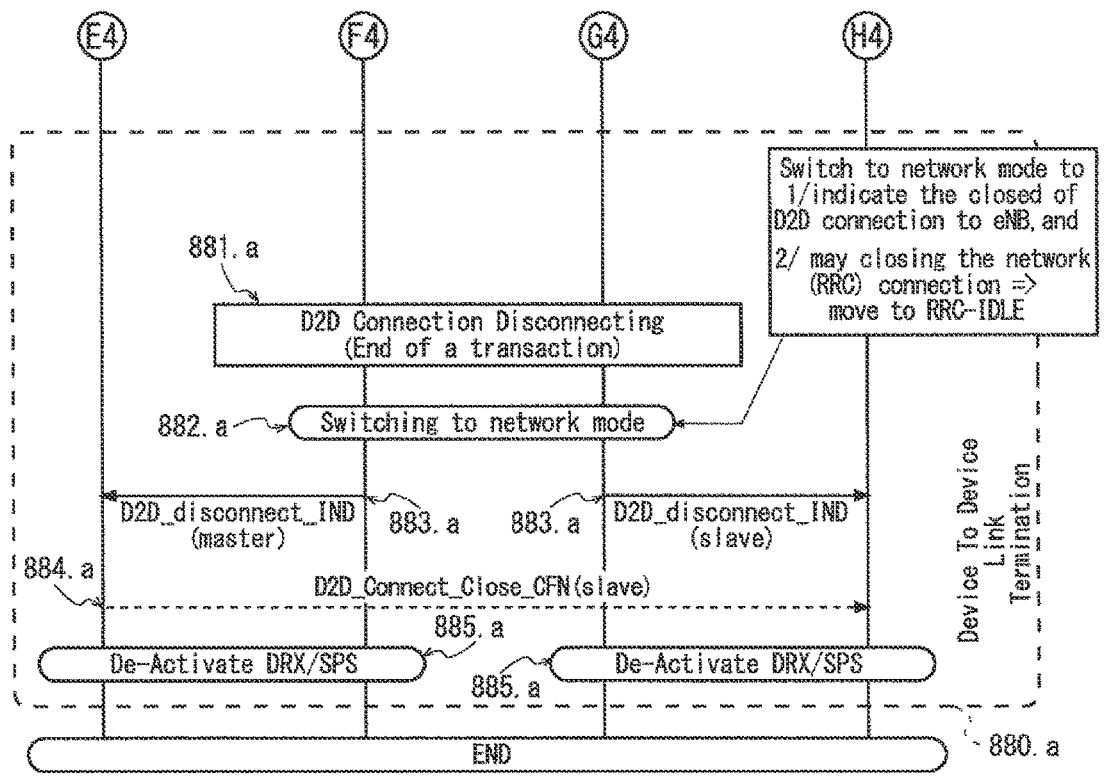
FIG. 15C helps to illustrate a direct communication establishment and termination procedure where D2D-UEs belong to multiple access nodes.
Figure 16A:
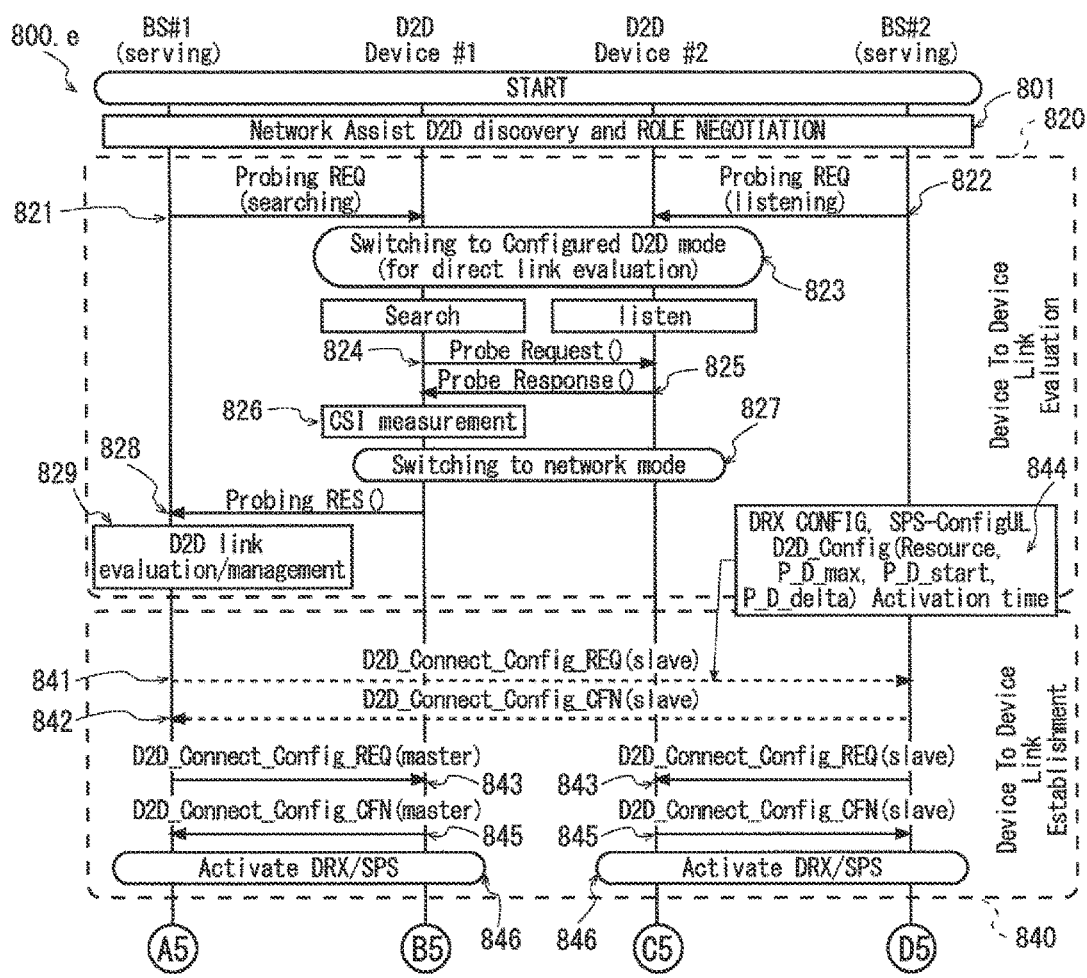
FIG. 16A helps to illustrate a direct communication establishment and termination procedure where D2D-UEs belong to multiple access nodes and there is a D2D connection failure.
Figure 16B:
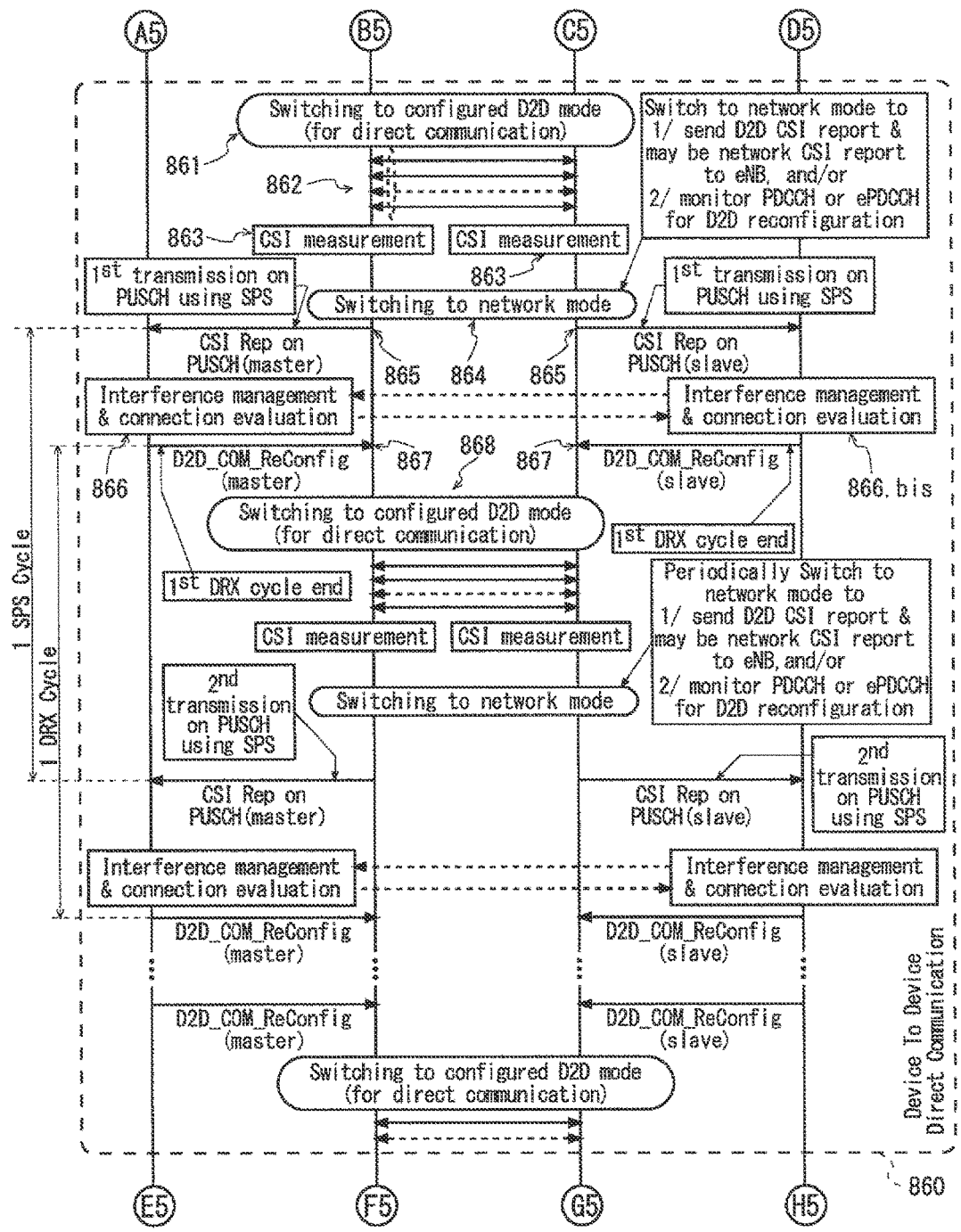
FIG. 16B helps to illustrate a direct communication establishment and termination procedure where D2D-UEs belong to multiple access nodes and there is a D2D connection failure.
Figure 16C:
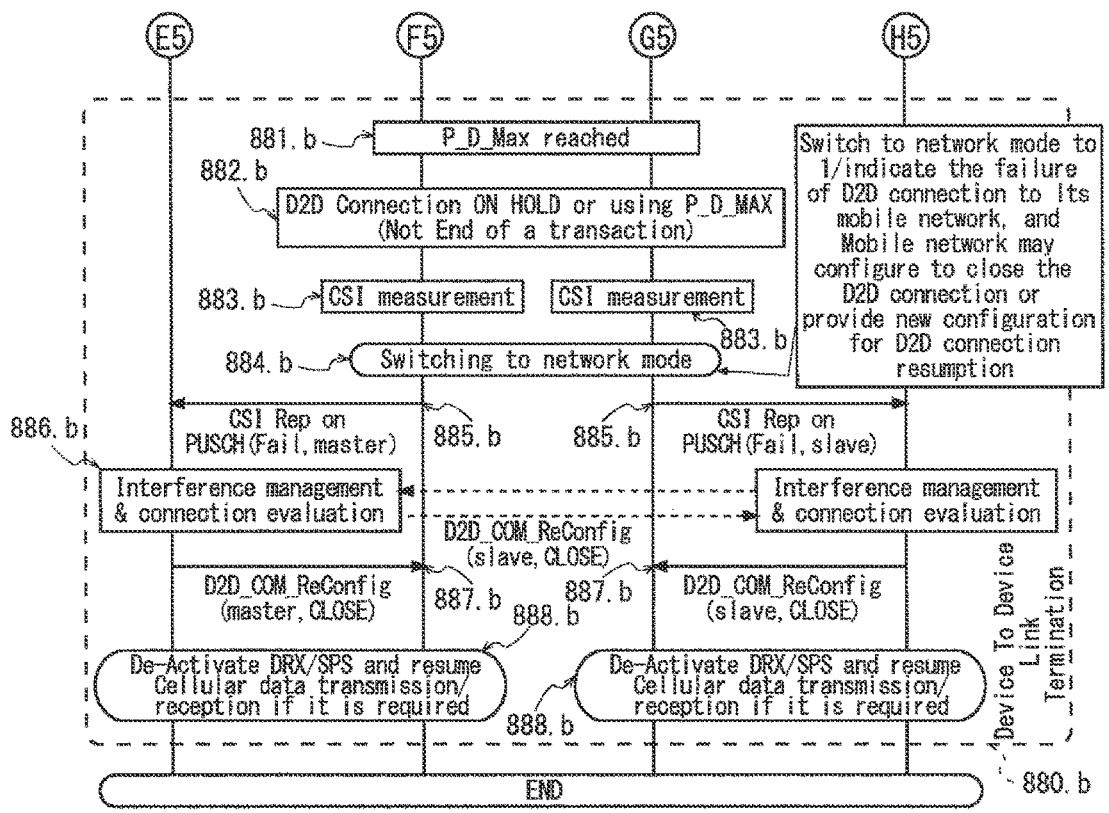
FIG. 16C helps to illustrate a direct communication establishment and termination procedure where D2D-UEs belong to multiple access nodes and there is a D2D connection failure.
Figure 17A:
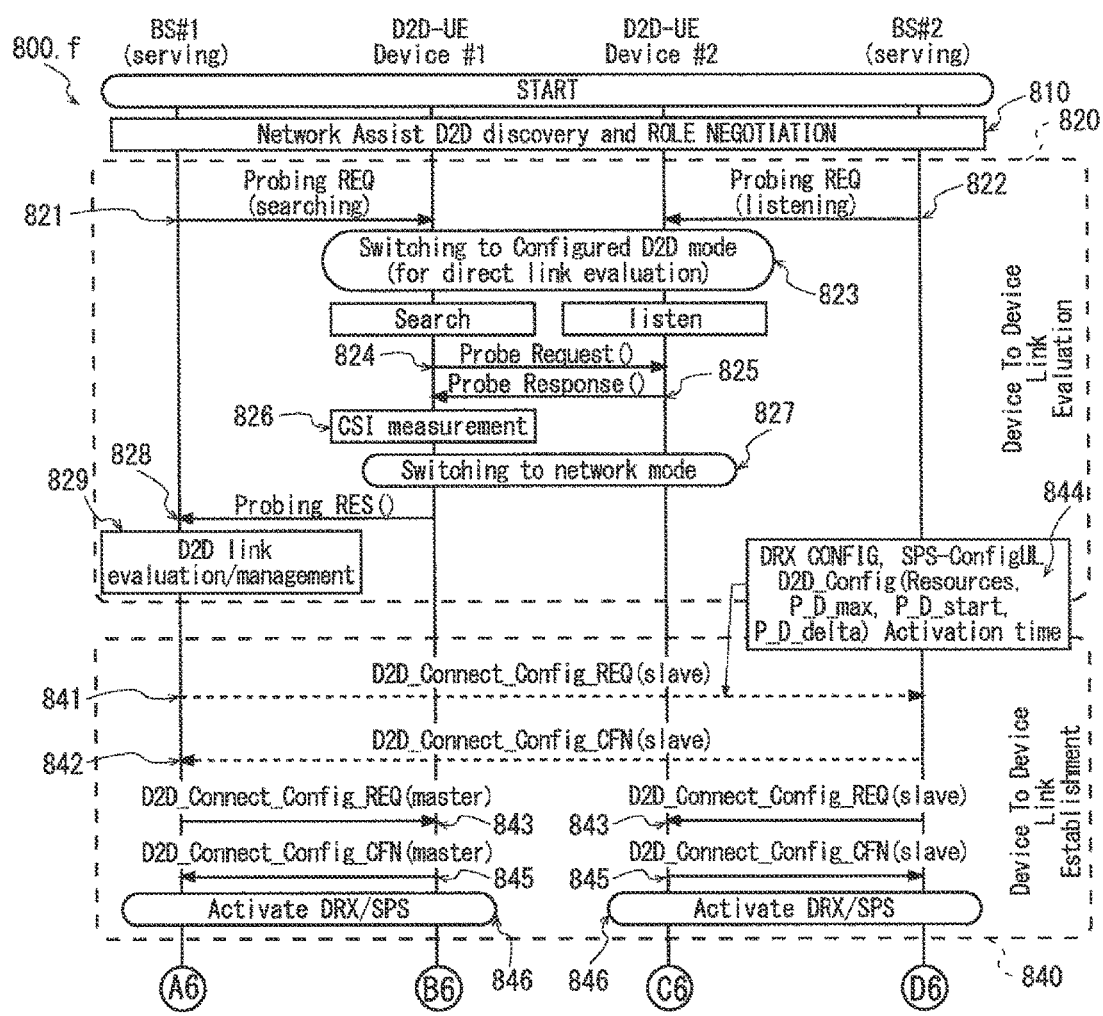
FIG. 17A helps to illustrate a direct communication establishment and termination procedure where D2D-UEs belong to multiple access nodes and termination of the connection is access node initiated.
Figure 17B:
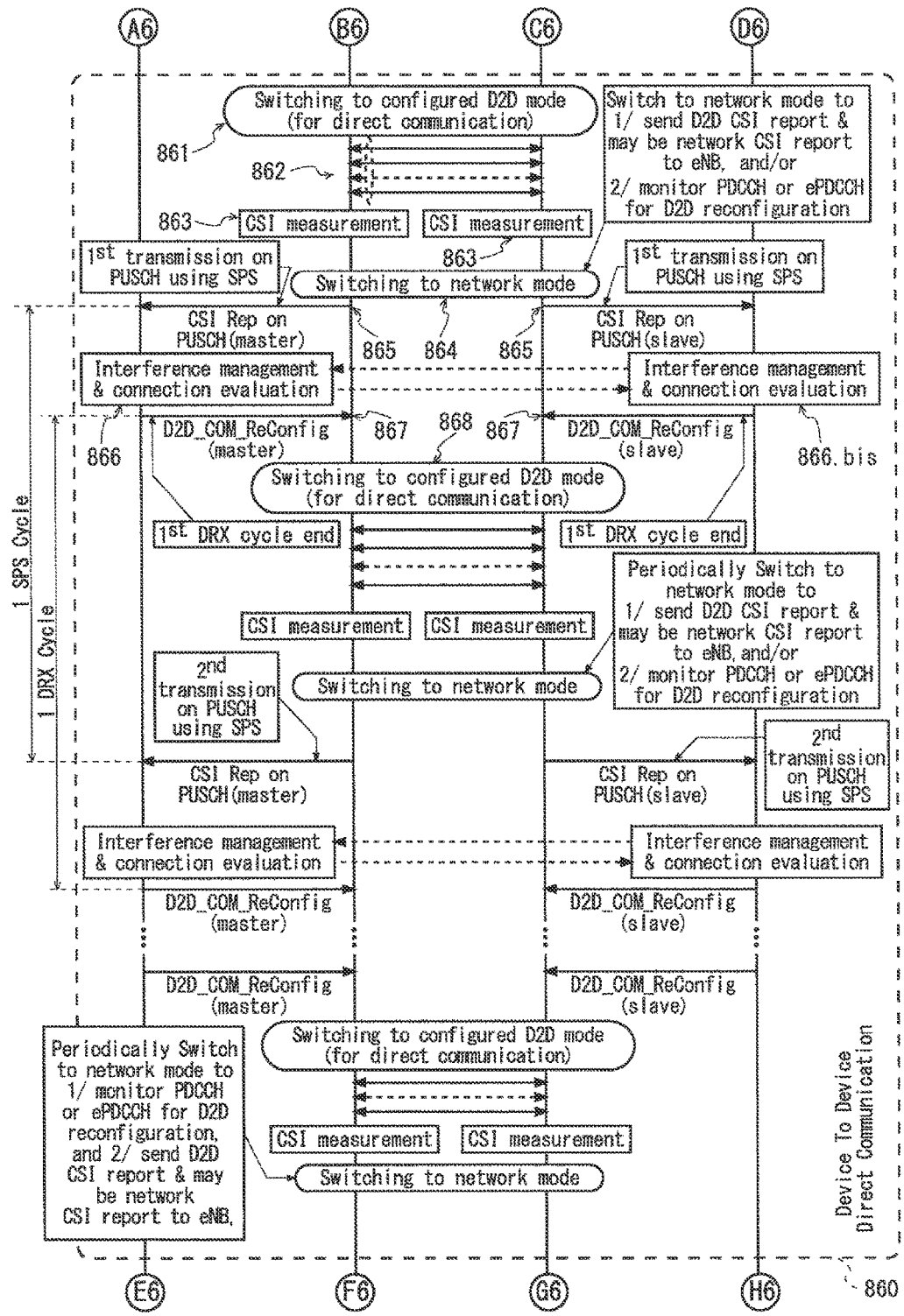
FIG. 17B helps to illustrate a direct communication establishment and termination procedure where D2D-UEs belong to multiple access nodes and termination of the connection is access node initiated.
Figure 17C:
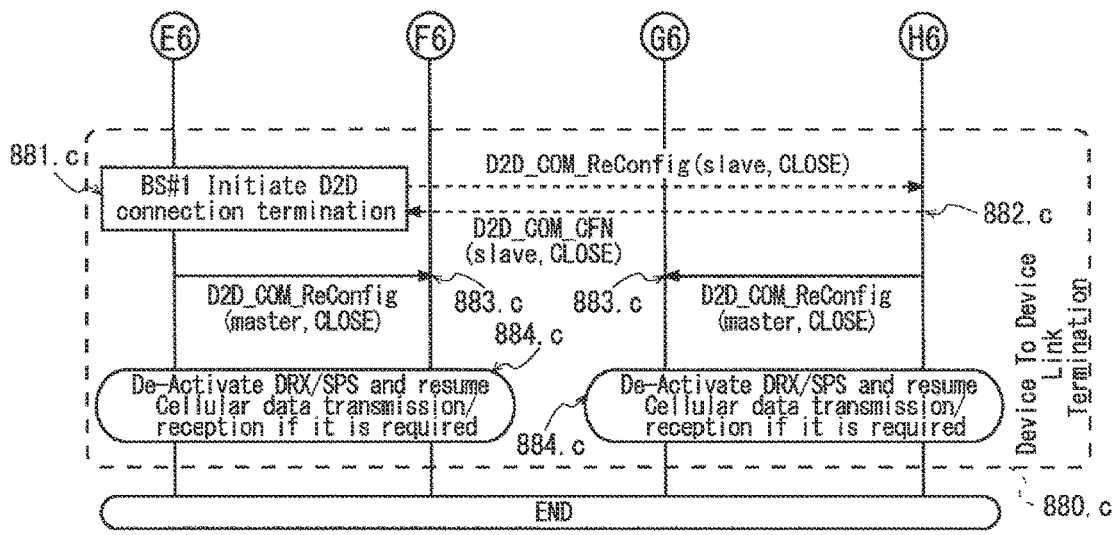
FIG. 17C helps to illustrate a direct communication establishment and termination procedure where D2D-UEs belong to multiple access nodes and termination of the connection is access node initiated.

FIGS. 12A-12C illustrate a single access node-direct communication establishment-termination procedure by D2D-UE(s). FIGS. 13A-13C illustrate a single access node-direct communication establishment-termination procedure by D2D-UE connection failure. FIGS. 14A-14C illustrate a single access node-direct communication establishment-termination procedure by Access Node initiated termination. FIGS. 15A-15C illustrate a multiple access nodes-direct communication establishment-termination procedure by D2D-UE(s). FIGS. 16A-16C illustrate a multiple access nodes-direct communication establishment-termination procedure by D2D-UE(s) connection failure. FIGS. 17A-17C illustrate a multiple access nodes-direct communication establishment-termination procedure by access node initiated Termination. With reference to exemplary systems 800.a, 800.b, 800.c, 800.d, 800.e and 800.f illustrated in FIGS. 12A-12C, 13A-13C, 14A-14C, 15A-15C, 16A-16C, and 17A-17C respectively, D2D Initial Link Evaluation 820 includes:

As indicated by 821, a serving access node may send a Probing_REQ(searching) message to D2D group owner(s) for searching, and as indicated by 822 a serving access node may send Probing_REQ(listening) message to D2D client(s) for listening. The access node in step 821 may be the same as that in step 822 if paired D2D-UEs belong to the same access node as is illustrated in system 800.a (FIGS. 12A-12C), 800.b (FIGS. 13A-13C) and 800.c (FIGS. 14A-14C). Otherwise, they are different as illustrated in system 800.d (FIGS. 15A-15C), 800.e (FIGS. 16A-16C) and 800.f (FIGS. 17A-17C).

Upon the successful reception of Probing_REQ( ) messages from their access node(s), paired D2D-UEs will switch to network configured D2D mode for the 1$^{st}$ time, as indicated by 823, at network configured "Activation time".

In the initially configured D2D mode, a group owner will perform "search" in a given time period by sending "Probe_Request(s)" messages 824 on the configured channel/resource intended for establishing D2D communication. A client will perform "listen" in a predetermined given time period by monitoring the configured channel/resource for a "Probe_Request( )" message. Upon the reception of a "Probe_Request( )", a client will respond with a "Probe_Response( )" message 825. A client may include CSI that it observed when monitoring the configured channel/resource for a "Probe_Request( )" in the response message.

Upon reception of a Probe_Response( ) message from a client, a group owner may perform CSI measurement 826. A group owner may include CSI observed by a client into its own CSI measurement to reflect the actual D2D CSI.

As indicated by 827, paired D2D-UEs switch back to network (i.e. cellular) mode on the predefined time in the format of SFN and subframe number configured by cellular access node(s).

In the network (cellular) mode after step 827, at predetermined SFN and subframe number, a group owner will send Probing_RES( ) 828 including its initially observed direct communication CSI and its regular measured cellular network CSI to its access node. In the network (cellular) mode after step 827, a client may resume its cellular communication that currently put on hold or re-enter previously configured DRX mode to wait for further instruction from its own access node.

Upon the reception of Probing_RES( ) from a group owner, an access node will further perform D2D link evaluation/management 829. D2D link evaluation/management 829 may include comparison of the reported D2D link CSI with the reported cellular link CSI, and making a decision on whether it is beneficial to the cellular network to activate direct communication or continue cellular communication for user data transmission and reception between the intended paired D2D-UE(s). If direct communication is considered beneficial to the cellular network, "D2D link evaluation/management" in step 829 may further involve actions in deriving direct communication parameter values including but not limited to maximum transmit power (P_D_max), initial transmit power (P_D_start), power control step size (P_D_delta), resource allocation, etc. Otherwise, the attempt for direct communication setting is terminated by path 830 in the method 800 (see FIG. 11).

Once a decision to activate direct communication has been confirmed in the D2D Initial Link Evaluation 820, the method 800 may further proceed with Device to Device Link Establishment 840 to configure paired D2D-UE(s) for direct communication. The D2D configuration may consist of DRX configuration and SPS configuration for UL to allow D2D-UEs to retain their current RRC_CONNECTED mode with their serving access node(s) for control-plane connectivity.

In the case that paired D2D-UE(s) belong to single access node, and referring to system 800.*a*, 800.*b* and 800.*c* illustrated in FIGS. 12A-12C, 13A-13C and 14A-14C respectively, the D2D link establishment block 840 further comprises:

As indicated by 843, the access node sends a D2D_Connect_Config_REQ( ) message to D2D-UE(s) under its control. The D2D_Connect_Config_REQ( ) message may further include DRX configuration, SPS configuration for UL, and D2D configuration with associated Activation time as shown at 844 for periodically monitoring cellular DL channel(s) for reconfiguration, periodically sending D2D link CSI report on cellular UL channel(s) and operating direct communication respectively.

In response to the reception of a D2D_Connect_Config_REQ( ) paired D2D-UEs will send a D2D_Connect_Config_CONF( ) message to their access node(s) in step 845 to acknowledge the completion of the D2D Link establishment.

Upon receiving D2D_Connect_Config_CONF( ) messages from paired D2D-UEs, the access node(s) will activate DRX and/or UL_SPS on the agreed activation time at step 846.

Where the paired D2D-UEs belong to more than one access node and with reference to systems 800.*d*, 800.*e* and 800.*f* illustrated in FIGS. 15A-15C, 16A-16C and 17A-17C respectively, the D2D Link Establishment 840 further includes additional steps 841 and 842 for communicating common D2D configuration derived in the group owner's access node and reference timing to client's access node before carrying out step 843 and onward as described above.

Once D2D Link Establishment 840 has been completed, the method 800 will further perform a D2D Direct Communication procedure 860. The D2D Direct Communication procedure 860 includes:

Direct communication following the cellular network configured parameters including, but not limited to, maximum transmit power (P_D_max), initial transmit power (P_D_start), power control step size (P_D_delta), and D2D resource allocation.

Using the 3GPP LTE SPS-ConfigUL feature for configuring D2D-UE(s) to switch to direct communication mode in a timely manner to perform direct communication on the network configured resources and periodically switch back to cellular network mode in a timely manner to send up-to-date D2D link CSI on pre-configured cellular UL channel(s).

Using the 3GPP LTE DRX feature for configuring D2D-UE(s) to switch to direct communication mode in a timely manner to perform direct communication on the network configured resources and periodically switch back to cellular network mode in a timely manner to monitor cellular DL channel for any change, modification or reconfiguration of D2D communication.

Where the paired D2D-UEs belong to either a single access node or multiple access nodes, and with reference to the systems 800.*a*, 800.*b*, 800.*c*, 800.*d*, 800.*e*, and 800.*f* illustrated in FIGS. 12A-12C, 13A-13C, 14A-14C, 15A-15C, 16A-16C and 17A-17C respectively, the D2D Communication 860 further includes:

As indicated by 861, at predefined reference timing, both paired D2D-UEs simultaneously switch to D2D mode for starting direct data exchange.

As indicated by 862, based on D2D_Config information obtained in step 843, the paired D2D-UEs perform direct data exchange with each other using group owner-client or master-slave concept.

As indicated by 863, periodically toward the end of a configured SPS-ConfigUL cycle, the paired D2D-UEs will perform D2D link CSI measurement.

As indicated by 864, in a predetermined radio frame & subframe before a subframe in which D2D-UEs are supposed to report D2D link CSI, paired D2D-UEs switch to cellular mode.

As indicated by 865, on a predetermined subframe within a radio frame, and on predetermined allocated cellular UL resource(s) configured by cellular access node(s), D2D-UE(s) will send a CSI report to their access node(s). The reported CSI may include CSI measured by the D2D-UE during D2D mode and CSI measured by the D2D-UE during cellular mode.

As indicated by 866, based on reported CSI, the group owner's access node will perform an "interference management & connection evaluation" procedure and derive an updated set of D2D parameter values for D2D reconfiguration. If paired D2D-UEs belong to different access nodes, there is an extra step 866.*bis* (illustrated in systems 800.*d*, 800.*e* and 800.*f*) that involves routing a client's reported CSI to the group owner's access node in exchange for updated D2D reconfiguration.

As indicated by 867, periodically toward the end of a DRX cycle, a D2D-UE is supposed to be in cellular mode, and on a predetermined radio frame and subframe(s) configured by cellular access node(s), a D2D-UE will monitor cellular DL channel(s) for D2D_COM_ReConfig( ) message that consists of updated D2D reconfiguration.

As indicated by 868, after each reception of a D2D_COM_ReConfig( ) message, on a predetermined radio frame and subframe, a D2D-UE will switch back to D2D mode for a new cycle of D2D communication repeated from step 861.

It is important to note that an access node may configure DRX and SPS_ConfigUL for a D2D-UE having a DRX cycle end and SPS-ConfigUL cycle end within a radio frame to reduce the number of switches from cellular mode to D2D mode and via versa. According the architectures disclosed above, architectures with CA capability allow D2D-UE operating in dual connectivity mode to maintain cellular network connectivity on primary carrier component while performing direct link communication on other secondary carrier component allocated for D2D communication.

A D2D Direct Communication procedure 860 may be terminated by D2D-UE(s) when a D2D transaction has been completed, or by a failure of the D2D link in maintaining desired or sufficient quality under the constraints of the cellular network configured parameter values, or by cellular network access nodes such as cellular base stations. Thus the method 800 further includes D2D Link Termination 880 for closing an existing D2D Communication.

For the case that a direct communication is terminated by D2D-UE(s) when a D2D transaction has been completed, the D2D Link Termination procedure 880 is further discussed with reference to systems 800.*a* and 800.*d* illustrated in FIGS. 12A-12C and 15A-15C for single access node and multiple access nodes systems respectively. With reference to systems 800.*a* and 800.*d*, D2D Link Termination by D2D-UE(s) 880.*a* includes:

As indicated by 881.*a*, this step resides within the D2D mode, and in this step paired D2D-UEs have completed a D2D transaction and decide to terminate the D2D connection to conserve power and release the allocated resources.

As indicated by 882.*a*, once a decision to terminate the D2D connection by D2D-UEs has been reached, paired D2D-UEs switch back to cellular mode and wait for the current SPS-ConfigUL cycle to end to send a D2D disconnection indication message to their access nodes on the pre-scheduled cellular UL channel(s) according to current LTE SPS for UL.

As indicated by 883.*a*, at the end of the current SPS-ConfigUL cycle, on a predetermined subframe within a radio frame, and on a predetermined allocated cellular UL resource(s) configured by cellular access node(s), D2D-UEs will send a "D2D_disconnect_IND( )" message instead of a regular "CSI Rep" message to their access node(s).

As indicated by 885.*a*, upon receipt of a "D2D_disconnect_IND( )" message from its D2D-UEs, an access node may de-activate DRX and SPS setting for those particular D2D-UEs. The access node may further configure the D2D-UEs to leave RRC_CONNECTED mode for RRC IDLE mode if RRC_CONNECTED mode is no longer needed for that particular D2D-UEs.

For the case that paired D2D-UEs belong to more than one access node, and with reference to exemplary system 800.*d* illustrated in FIGS. 15A-15C, the "D2D link termination" 880.*a* further includes an additional step 884.*a*, namely communicating a "D2D_Connect_Close_CFN( )" message to the client's access node to confirm the D2D connection close before carrying out step 885.*a* and onwards as discussed above.

For the case that a D2D communication is terminated by a failure of the D2D link in maintaining desired or sufficient quality under the constraints of the cellular network configured parameter values, the D2D Link Termination procedure 880 is further discussed with reference to systems 800.*b* and 800.*e* illustrated in FIGS. 13A-13C and 16A-16C for single access node and multiple access nodes systems respectively. With reference to systems 800.*b* and 800.*e*, the D2D Link Termination by D2D connection failure 880.*b* further comprises:

As indicated by 881.*b*, this step resides with D2D mode. In this step a restriction set by the cellular network, e.g. that a parameter such as P_D_max is no longer suitable for D2D-UEs to maintain desired or sufficient D2D communication quality, is reached.

As indicated by 882.*b*, once the above restriction set by the cellular network is reached, D2D communication will be put on hold for the remainder of the DRX or SPS_ConfigUL_cycle.

As indicated by 883.*b*, D2D-UEs may perform CSI measurement as usual while still in D2D mode.

As indicated by 884.*b*, at the end of the current SPS_ConfigUL cycle, in a predetermined radio frame & subframe before a subframe in which D2D-UEs are supposed to report D2D link CSI, both paired D2D-UEs switch to cellular mode.

As indicated by 885.*b*, on the predetermined subframe within a radio frame, and on a predetermined allocated cellular UL resource(s) configured by cellular access node(s), D2D-UEs will send a CSI report to their access node(s). The reported CSI may include the D2D connection failure indication and associated information for decision making by access node(s).

As indicated by 887.*b*, upon the receipt of the CSI report with D2D connection failure indication from its D2D-UE(s), an access node may provide D2D-UEs a new set of parameter values for continuation of D2D communication or close the current D2D communication and resume cellular communication to complete the current transaction, as shown in this case. After sending the CSI report with D2D connection failure indication to their access nodes, D2D-UEs will monitor the cellular DL channel for further RRC control information. Upon the receipt of a CSI report with D2D connection failure indication from its D2D-UEs, and cellular access node has decided to close the currently configured D2D communication, an access node will send a "D2D_COM_ReConfig(close)" message to its D2D-UE(s) to confirm the D2D connection close and instruct the resumption of cellular user data connection if it is required.

As indicated by 888.*b*, upon sending the "D2D_COM_ReConfig(close)" to its D2D-UE(s), the access node will de-activate the current configured DRX and SPS_ConfigUL and resume the current user data transaction using cellular data connection.

For the case that paired D2D-UEs belong to more than one access node, and with reference to system 800.*e* illustrated in FIGS. 16A-16C, the D2D Link Termination 880.*b* further includes an additional step 886.*b*, namely communicating a "D2D_COM_ReConfig(CLOSE)" message to the client's access node to indicate the D2D connection close before carrying out step 887.*b* and onwards as described above.

For the case that a direct communication is terminated by a cellular access node(s), the D2D Link Termination procedure 880 is further discussed with reference to systems 800.*c* and 800.*f* illustrated in FIGS. 14A-14C and 17A-17C for single access node and multiple access node systems respectively. With reference to systems 800.*c* and 800.*f*, "D2D Link Termination" by an access node(s) 880.*c* further comprises:

As indicated by 883.*c*, once an access node has decided to terminate a D2D connection, it can wait until the end of a current DRX cycle, for D2D-UEs under its control to switch back to cellular mode to monitor cellular DL channels. At the end of a current DRX cycle, on a subframe(s) in a radio frame in which a D2D-UE is supposed to monitor DL channel for RRC signalling, the access node(s) will send "D2D_CON_ReConfig (close)" to the intended D2D-UE(s) to indicate the closing of its current D2D link.

As indicated by 884.*c*, upon receipt of the "D2D_CON_ReConfig(close)" message from its access node, a D2D-UE may resume its cellular connection and re-establish data connection in cellular mode with its pairing D2D-UE to complete the current data transaction.

For the case that paired D2D-UEs belong to more than one access node, and with reference to system 800.*f* illustrated in FIGS. 17A-17C, the D2D link termination block 880.*c* further includes an additional step 881.*c*, namely communicating a "D2D_CON_ReConfig(close)" message to the pairing access node to indicate the D2D connection close. Upon the reception of "D2D_CON_ReConfig(close)" message, the pairing access node will respond with "D2D_CON_CFN(close)" 882.*c* to confirm the D2D connection close. These additional steps 881.*c* and 882.*c* should happen before carrying out step 883.*c* and onwards as discussed above.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian Patent Application No. 2013901432, filed on Apr. 24, 2013, the disclosure of which is incorporated herein in its entirety by reference.

[Supplementary Note 1]

A wireless communication system comprising:

a cellular network including one or more access nodes, and user equipments (UEs) which can operate in a cellular mode where data is transmitted from one UE to another via one or more of the access nodes, and at least some UEs are device-to-device (D2D) capable UEs (D2D-UEs) which can also operate in a direct communication mode where a pair of D2D-UEs transmit data directly from one to the other, wherein D2D-UEs operating in the direct communication mode maintain control signaling connection with the cellular network, change to the cellular mode at one or more times and send channel state information (CSI) to the cellular network, and the cellular network uses CSI and/or network available geographical location information for D2D-UEs in determining whether to cause D2D-UEs to operate in the direct communication mode or to operate in the cellular mode.

[Supplementary Note 2]

The wireless communication system in Supplementary Note 1 wherein the wireless communication system is a D2D capable long term evolution (LTE) frequency division duplex (FDD) system with carrier aggregation (CA) capabilities.

[Supplementary Note 3]

The wireless communication system in Supplementary Note 2 wherein:

in the cellular mode an access node performs downlink signal and/or physical channel(s) transmission on one or both of a cellular primary downlink resource on a primary downlink component carrier and a cellular secondary downlink resource on an aggregated secondary downlink component carrier and UEs perform downlink signal and/or physical channel(s) monitoring or reception on one or both of the primary downlink component carrier and the secondary downlink component carrier, and concurrently the access node performs uplink signal and/or physical channel(s) reception on one or both of a cellular primary uplink resource on a primary uplink component carrier and a cellular secondary uplink resources on an aggregated secondary uplink component carrier and UEs performs uplink signal and/or physical channel(s) transmission on one or both of the primary uplink component carrier and the secondary uplink component carrier.

[Supplementary Note 4]

The wireless communication system in Supplementary Note 3 wherein when a pair of D2D-UEs is operating in the direct communication mode, on a specific subframe of a radio frame, only one of the D2D-UEs performs D2D transmission while the other performs D2D reception on a resource configured by the network for direct communication.

[Supplementary Note 5]

The wireless communication system in Supplementary Note 4 wherein:

the D2D-UEs each have CA capabilities and are able to perform reception and transmission on more than one component carrier, if the resource configured by the network for direct communication is on the primary uplink or downlink component carrier;

a D2D-UE which performs D2D reception on the primary downlink component carrier on a specific subframe can perform cellular uplink signal and/or physical channel(s) transmission on the primary uplink component carrier on the same subframe, a D2D-UE which performs D2D transmission on the primary uplink component carrier on a specific subframe can perform cellular downlink signal and/or physical channel(s) monitoring or reception on the primary downlink component carrier on the same subframe, and if the resource configured by the network for direct communication is on the secondary uplink or downlink component carrier or a component carrier dedicated for D2D, a D2D-UE which performs D2D transmission or reception on a particular sub-frame may optionally be configured to perform cellular uplink physical channel(s) and/or signal transmission and cellular downlink physical channel(s) and/or signal monitoring or reception on the primary uplink or downlink component carrier on the same sub-frame.

[Supplementary Note 6]

An architecture for a transmitter of a device-to-device (D2D) capable UE (D2D-UE), the architecture including:

a physical (Phys) layer which has a long term evolution (LTE) transmitter for cellular uplink communication on a resource allocated for cellular uplink transmission and a D2D transmitter for D2D communication on a resource allocated for D2D transmission a medium access control (MAC) layer which has:

one or more LTE hybrid-automatic retransmission request (HARQ) entities for cellular communication and also a D2D HARQ entity for D2D communication, and a LTE-D2D mode switching entity for selecting the appropriate HARQ entity/entities and for providing control signals for selecting the appropriate transmitter for one or both of cellular and D2D communication with time, a LTE radio link control (RLC) layer, and a packet data convergence protocol (PDCP) layer.

[Supplementary Note 7]

The architecture for a transmitter in Supplementary Note 6, wherein:

the D2D-UE does not have carrier aggregation (CA) capabilities, the MAC layer has a single LTE HARQ entity for cellular communication, and the LTE-D2D mode switching entity is for selecting the appropriate HARQ entity and for providing control signals for selecting the appropriate transmitter for either cellular or D2D communication with time.

[Supplementary Note 8]

The architecture for a transmitter in Supplementary Note 6, wherein:

the D2D-UE has carrier aggregation (CA) capabilities, the MAC layer has more than one LTE HARQ entities for cellular communication, and the LTE-D2D mode switching entity is for selecting the appropriate HARQ entity and for providing control signals for selecting the appropriate transmitter for cellular and/or D2D communication with time.

[Supplementary Note 9]

An architecture for a receiver of a device-to-device (D2D) capable UE (D2D-UE), the architecture including:

a physical (Phys) layer which has a long term evolution (LTE) receiver for cellular downlink communication on a resource allocated for cellular downlink transmission and a D2D receiver for D2D communication on a resource allocated for D2D transmission, a medium access control (MAC) layer which has:

one or more LTE hybrid-automatic retransmission request (HARQ) entities for handling transport channel(s) reception in cellular communication and also a D2D HARQ entity for handling transport channel reception in D2D communication, and a LTE-D2D mode switching entity for selecting the appropriate HARQ entity/entities and for providing control signals for selecting the appropriate receiver for one or both of cellular and D2D communication with time, a LTE radio link control (RLC) layer, and a packet data convergence protocol (PDCP) layer.

[Supplementary Note 10]

The architecture for a receiver in Supplementary Note 9, wherein:

the D2D-UE does not have carrier aggregation (CA) capabilities, the MAC layer has a single LTE HARQ entity for cellular communication, and the LTE-D2D mode switching entity is for selecting the appropriate HARQ entity and for providing control signals for selecting the appropriate receiver for either cellular or D2D communication with time.

[Supplementary Note 11]

The architecture for a receiver in Supplementary Note 9, wherein:

the D2D-UE has carrier aggregation (CA) capabilities, the MAC layer has more than one LTE HARQ entities for cellular communication, and the LTE-D2D mode switching entity is for selecting the appropriate HARQ entity and for providing control signals for selecting the appropriate receiver for cellular and/or D2D communication with time.

REFERENCE SIGNS LIST

100 WIRELESS COMMUNICATION SYSTEM
102, 104 WIRELESS CONNECTIVITY
106 DIRECT COMMUNICATION
110*a*, 110*b*, 110*c* ACCESS NODE/BS
120*a*, 120*b*, 120*c* UE
130 MOBILE NETWORK/INTERNET
200 TDD SYSTEM
210 CELLULAR COMMUNICATION MODE
210.*a* DOWNLINK TRANSMISSION STATE
210.*b* UPLINK TRANSMISSION STATE 210.c TRANSITION BETWEEN A DOWNLINK TRANSMISSION STATE AND AN UPLINK TRANSMISSION STATE
211 DIRECT COMMUNICATION FUNCTION
212 CELLULAR COMMUNICATION FUNCTION
213 CARRIER FREQUENCY F1
214 SIGNAL/PHYSICAL CHANNEL MONITORING OR RECEPTION
215 PHYSICAL CHANNEL/SIGNAL TRANSMISSION
220a, 220b TRANSITION BETWEEN A CELLULAR COMMUNICATION STATE AND A DIRECT COMMUNICATION MODE
230 DIRECT COMMUNICATION MODE
231 CELLULAR COMMUNICATION FUNCTION
232 DIRECT COMMUNICATION FUNCTION
233 DIRECT COMMUNICATION
234 D2D TRANSMISSION
235 D2D RECEPTION
236 DIRECT COMMUNICATION ROLE SWITCHING
300 LTE-FDD SYSTEM
310 CELLULAR FDD COMMUNICATION MODE
311 DIRECT COMMUNICATION FUNCTION
312 CELLULAR COMMUNICATION FUNCTION
313 CELLULAR UPLINK RESOURCES
313.b CELLULAR DOWNLINK RESOURCES
330 DIRECT COMMUNICATION MODE
330.a, 330.b DIRECT COMMUNICATION SUB-MODE
331 CELLULAR COMMUNICATION FUNCTION
332 DIRECT COMMUNICATION FUNCTION
333, 333.b SHARED/DEDICATED DOWNLINK RESOURCE
334 D2D TRANSMISSION
335 D2D RECEPTION
336 DIRECT COMMUNICATION ROLE SWITCHING
340a, 340b PERIODIC SWITCHING
400 TDD SYSTEM
410 CELLULAR TDD COMMUNICATION MODE
410.a DOWNLINK TRANSMISSION STATE
410.b UPLINK TRANSMISSION STATE
410.c TRANSITION BETWEEN A DOWNLINK TRANSMISSION STATE AND AN UPLINK TRANSMISSION STATE
411 DIRECT COMMUNICATION FUNCTION
413 CELLULAR DOWNLINK RESOURCES/CELLULAR UPLINK RESOURCES
413.s CELLULAR AGGREGATED DOWNLINK RESOURCES/CELLULAR AGGREGATED UPLINK RESOURCES
420 PERIODIC SWITCHING
430 DIRECT COMMUNICATION MODE
431 DIRECT COMMUNICATION FUNCTION
433 RESOURCE FOR DIRECT COMMUNICATION
434 D2D TRANSMISSION
435 D2D RECEPTION
436 DIRECT COMMUNICATION ROLE SWITCHING
437 CELLULAR DL PHYSICAL CHANNEL/SIGNAL MONITORING OR RECEPTION
438 CELLULAR UL PHYSICAL CHANNEL/SIGNAL TRANSMISSION
500 LTE-FDD SYSTEM
510 CELLULAR FDD COMMUNICATION MODE
511 DIRECT COMMUNICATION FUNCTION
512 CELLULAR COMMUNICATION FUNCTION
513 CELLULAR PRIMARY DOWNLINK RESOURCES
514 CELLULAR SECONDARY DOWNLINK RESOURCES
515 CELLULAR PRIMARY UPLINK RESOURCES
516 CELLULAR SECONDARY UPLINK RESOURCES
520 PERIODIC SWITCHING
530 DIRECT COMMUNICATION MODE
531 DIRECT COMMUNICATION FUNCTION
532 CELLULAR COMMUNICATION FUNCTION
533 RESOURCE FOR DIRECT COMMUNICATION
534 D2D TRANSMISSION
535 D2D RECEPTION
536 PERIODICALLY SWITCHING
537 PCC OR PCELL'S RESOURCES
600 ARCHITECTURE EVOLUTION
610 BASIC LTE-UE TRANSMITTER ARCHITECTURE
611 MAC LAYER
612 HARQ ENTITY
615 PHYS LAYER
616 LTE TRANSMITTER
617 ALLOCATED RESOURCE
620 LTE-UE TRANSMITTER EVOLUTION PATH
630 D2D-UE TRANSMITTER ARCHITECTURE
631 MAC LAYER
632 EXISTING HARQ ENTITY
633 LTE-D2D MODE SWITCHING ENTITY
633.s CONTROL SIGNAL
634 D2D HARQ ENTITY
635 PHYS LAYER
636 LTE TRANSMITTER
637 CELLULAR ALLOCATED RESOURCE
638 D2D TRANSMITTER
639 D2D ALLOCATED RESOURCES
650 ARCHITECTURE EVOLUTION
660 BASIC LTE-UE RECEIVER ARCHITECTURE
661 MAC LAYER
662 HARQ ENTITY
665 PHYS LAYER
666 LTE RECEIVER
667 ALLOCATED RESOURCE
670 LTE-UE RECEIVER EVOLUTION PATH
680 D2D-UE RECEIVER ARCHITECTURE
681 MAC LAYER
682 EXISTING HARQ ENTITY
683 LTE-D2D MODE SWITCHING ENTITY
683.s CONTROL SIGNAL
684 D2D HARQ ENTITY
685 PHYS LAYER
686 LTE RECEIVER
687 CELLULAR DL ALLOCATED RESOURCE
688 D2D RECEIVER
689 D2D ALLOCATED RESOURCES
700 ARCHITECTURE EVOLUTION
710 BASIC LTE-UE TRANSMITTER ARCHITECTURE
711 MAC LAYER
712, 712.s HARQ ENTITY
715 PHYS LAYER
716 LTE TRANSMITTER
717, 717.s ALLOCATED RESOURCE
720 LTE-UE TRANSMITTER EVOLUTION PATH
730 D2D-UE TRANSMITTER ARCHITECTURE
731 MAC LAYER
732, 732.s EXISTING HARQ ENTITY
733 LTE-D2D MODE SWITCHING ENTITY
733.s CONTROL SIGNAL
734 D2D HARQ ENTITY
735 PHYS LAYER
736 LTE TRANSMITTER
737 CELLULAR UL ALLOCATED RESOURCE
738 D2D TRANSMITTER
739 D2D ALLOCATED RESOURCES

750 ARCHITECTURE EVOLUTION
760 BASIC LTE-UE RECEIVER ARCHITECTURE
761 MAC LAYER
762, 762.s HARQ ENTITY
765 PHYS LAYER
766 LTE RECEIVER
767, 767.s ALLOCATED RESOURCE
770 LTE-UE RECEIVER EVOLUTION PATH
780 D2D-UE RECEIVER ARCHITECTURE
781 MAC LAYER
782, 782.s EXISTING HARQ ENTITY
783 LTE-D2D MODE SWITCHING ENTITY
783.s CONTROL SIGNAL
784 D2D HARQ ENTITY
785 PHYS LAYER
786 LTE RECEIVER
787 CELLULAR DL ALLOCATED RESOURCE
788 D2D RECEIVER
789 D2D ALLOCATED RESOURCES

The invention claimed is:

1. A method for use in device-to-device (D2D) communication in a wireless communication system, the wireless communication system comprising a cellular network including one or more access nodes, and user equipments (UEs) which can operate in a cellular mode where data is transmitted from one UE to another via one or more of the access nodes, at least some UEs being D2D capable UEs (D2D-UEs) which can also operate in a direct communication mode where a pair of D2D-UEs transmit data directly from one to the other over a D2D communication link (D2D link), the method comprising:
   maintaining a control signaling connection between D2D-UEs operating in the direct communication mode and the cellular network;
   causing D2D-UEs operating in the direct communication mode to change to the cellular mode at one or more times and to send channel state information (CSI) to the cellular network;
   using the CSI and/or network available geographical location information for D2D-UEs to determine whether to cause D2D-UEs to operate in the direct communication mode or the cellular mode;
   wherein the method further comprising one or more of the following:
   performing network assisted discovery which includes determining if D2D-UEs are available for direct communication;
   performing initial D2D link evaluation which includes assessing channel state information (CSI) of one or both of the D2D link and the cellular network to decide whether to establish direct communication or continue cellular mode communication;
   performing D2D link establishment to establish the D2D link;
   performing direct communication over the D2D link; and
   performing D2D link termination to terminate the D2D link;
   wherein the performing network assisted discovery includes one D2D-UE being assigned a role of D2D group owner and one or more other D2D-UEs being assigned a role of D2D client, wherein a D2D group owner and a D2D client are paired D2D-UEs for direct communication;
   wherein the performing initial D2D link evaluation includes the following:
   switching paired D2D-UEs to the direct communication mode,
   in the direct communication mode, sending, by the D2D group owner, a probe request message to the D2D client and upon reception of the probe request message, sending, by the D2D client, first CSI observed by the D2D client to the D2D group owner,
   performing, by the D2D group owner, CSI measurement to obtain second CSI and cellular link CSI,
   switching paired D2D-UEs back to cellular mode at a predefined time;
   in the cellular mode, reporting, by the D2D group owner, the first CSI, the second CSI, and the cellular link CSI to its access node, and
   performing, by the access node, D2D link management, said D2D link management including comparing the reported first CSI and second CSI with the reported cellular link CSI, and making a decision on whether to activate direct communication or continue cellular communication for D2D-UEs.

2. The method as claimed in claim 1, wherein the D2D link establishment, the direct communication and the D2D link termination are performed only if D2D-UEs are available for direct communication and it is decided to proceed with direct communication in the D2D link evaluation.

3. The method as claimed in claim 1, wherein performing D2D link management includes deriving direct communication parameter values for use in the direct communication if it is decided to activate direct communication.

4. The method as claimed in claim 1 wherein D2D link termination is performed when a D2D transaction has been completed, or by a failure of the D2D link, or by cellular network access nodes.

5. A wireless communication system comprising:
   a cellular network including one or more access nodes, and
   user equipments (UEs) which can operate in a cellular mode where data is transmitted from one UE to another via one or more of the access nodes, and at least some UEs are device-to-device (D2D) capable UEs (D2D-UEs) which can also operate in a direct communication mode where a pair of D2D-UEs transmit data directly from one to the other,
   wherein D2D-UEs operating in the direct communication mode maintain control signaling connection with the cellular network, change to the cellular mode at one or more times and send channel state information (CSI) to the cellular network, and the cellular network uses CSI and/or network available geographical location information for D2D-UEs in determining whether to cause D2D-UEs to operate in the direct communication mode or to operate in the cellular mode,
   wherein the cellular network performs network assisted discovery which includes determining if D2D-UEs are available for direct communication, assigning a role of D2D group owner to one D2D-UE, and assigning a role of D2D client to one or more other D2D-UEs, wherein a D2D group owner and a D2D client are paired D2D-UEs for direct communication,
   wherein the cellular network switches paired D2D-UEs to the direct communication mode,
   wherein, in the direct communication mode, the D2D group owner sends a probe request message to the D2D client and upon reception of the probe request message, and the D2D client sends first CSI observed by the D2D client to the D2D group owner, and the D2D group owner performs CSI measurement to obtain second CSI and cellular link CSI, and the cellular network switches paired D2D-UEs back to cellular mode at a predefined time, and wherein, in the cellular mode, the D2D group owner reports the first CSI, the second CSI, and the cellular link CSI to its access node, and the access node performs D2D link management, said D2D link management including comparing the reported first CSI and second CSI with the reported cellular link CSI, and making a decision on whether to activate direct communication or continue cellular communication for D2D-UEs.

6. The wireless communication system as claimed in claim 5 wherein the wireless communication system is a D2D capable long term evolution (LTE) time division duplex (TDD) system without carrier aggregation (CA) capabilities.

7. The wireless communication system as claimed in claim 6 wherein the cellular mode comprises a downlink transmission state and an uplink transmission state, wherein, in the downlink transmission state an access node performs signal and/or physical channel(s) transmission and a UE performs signal and/or physical channel(s) monitoring or reception on a carrier frequency, and in the uplink transmission state the access node performs signal and/or physical channel(s) reception and a UE performs signal and/or physical channel(s) transmission also on the carrier frequency.

8. The wireless communication system as claimed in claim 7 wherein when a pair of D2D-UEs is operating in the direct communication mode, on a specific subframe of a radio frame, only one of the D2D-UEs performs D2D transmission while the other performs D2D reception on the said carrier frequency or on a carrier component dedicated for direct communication.

9. The wireless communication system as claimed in claim 5 wherein the wireless communication system is a D2D capable long term evolution (LTE) frequency division duplex (FDD) system without carrier aggregation (CA) capabilities.

10. The wireless communication system as claimed in claim 9 wherein in the cellular mode an access node performs downlink signal and/or physical channel(s) transmission and a UE performs downlink signal and/or physical channel(s) monitoring or reception on a downlink carrier frequency, and concurrently the access node performs uplink signal and/or physical channel(s) reception and a UE performs uplink signal and/or physical channel(s) transmission on an uplink carrier frequency.

11. The wireless communication system as claimed in claim 10 wherein when a pair of D2D-UEs is operating in the direct communication mode, on a specific subframe of a radio frame, only one of the D2D-UEs performs D2D transmission while the other performs D2D reception on the downlink carrier frequency or on the uplink carrier frequency or on a carrier component dedicated for direct communication.

12. The wireless communication system as claimed in claim 11 wherein:

the D2D-UEs each have a full duplexer enabling them to perform concurrent transmission and reception on different carrier frequencies, a D2D-UE operating in the direct communication mode which performs D2D reception on the downlink carrier frequency on a specific subframe can perform cellular uplink signal and/or physical channel(s) transmission on the cellular uplink carrier frequency on the same subframe, and a D2D-UE operating in the direct communication mode which performs D2D transmission on the cellular uplink carrier frequency on a specific subframe can perform cellular downlink signal and/or physical channel(s) monitoring or reception on the cellular downlink carrier frequency on the same subframe.

13. The wireless communication system as claimed in claim 5 wherein the wireless communication system is a D2D capable long term evolution (LTE) time division duplex (TDD) system with carrier aggregation (CA) capabilities.

14. The wireless communication system as claimed in claim 13 wherein the cellular mode comprises a downlink transmission state and an uplink transmission state, wherein;

in the downlink transmission state an access node with CA capabilities performs downlink signal and/or physical channel(s) transmission on a cellular downlink resource on a primary component carrier and optionally also on a cellular aggregated downlink resource on a secondary component carrier and a UE performs signal and/or physical channel(s) monitoring or reception on the same primary, and optionally secondary, component carrier(s), and in the uplink transmission state an access node with CA capabilities performs signal and/or physical channel(s) reception, and a UE performs uplink signal and/or physical channel(s) transmission, on the primary component carrier and optionally also on the secondary component carrier.

15. The wireless communication system as claimed in claim 14 wherein when a pair of D2D-UEs is operating in the direct communication mode, on a specific subframe of a radio frame, only one of the D2D-UEs performs D2D transmission while the other performs D2D reception on a resource configured by the network for direct communication.

16. The wireless communication system as claimed in claim 15 wherein:

the D2D-UEs each have CA capabilities enabling them to perform either transmission or reception on more than one component carrier, when the resource configured by the cellular network for direct communication is on the primary component carrier no cellular communication is performed in the direct communication mode, when the resource configured by the network for direct communication is on the secondary component carrier or a component carrier dedicated for direct communication:

a D2D-UE operating in the direct communication mode which performs D2D reception on a specific subframe can perform cellular downlink signal and/or physical channel(s) monitoring or reception on the primary component carrier in the same subframe, and a D2D-UE operating in the direct communication mode which performs D2D transmission on a specific subframe can perform cellular uplink signal and/or physical channel(s) transmission on the primary component carrier in the same subframe.

* * * * *